(12) United States Patent
Yoshino et al.

(10) Patent No.: US 10,489,604 B2
(45) Date of Patent: Nov. 26, 2019

(54) SEARCHABLE ENCRYPTION PROCESSING SYSTEM AND SEARCHABLE ENCRYPTION PROCESSING METHOD

(71) Applicant: HITACHI, LTD., Tokyo (JP)

(72) Inventors: Masayuki Yoshino, Tokyo (JP); Hisayoshi Sato, Tokyo (JP); Ken Naganuma, Tokyo (JP); Yoshinori Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 163 days.

(21) Appl. No.: 15/111,747

(22) PCT Filed: Jan. 14, 2015

(86) PCT No.: PCT/JP2015/050736
§ 371 (c)(1),
(2) Date: Jul. 14, 2016

(87) PCT Pub. No.: WO2015/108052
PCT Pub. Date: Jul. 23, 2015

(65) Prior Publication Data
US 2016/0335450 A1    Nov. 17, 2016

(30) Foreign Application Priority Data
Jan. 16, 2014   (JP) ................................ 2014-005718

(51) Int. Cl.
*H04L 29/06* (2006.01)
*G06F 21/62* (2013.01)
(Continued)

(52) U.S. Cl.
CPC ........ *G06F 21/6227* (2013.01); *G06F 16/334* (2019.01); *G06F 16/35* (2019.01); *H04L 9/008* (2013.01); *H04L 9/0894* (2013.01)

(58) Field of Classification Search
None
See application file for complete search history.

(56) References Cited

U.S. PATENT DOCUMENTS

| 9,391,965 B2 | 7/2016 | Hattori et al. |
| 2008/0133935 A1* | 6/2008 | Elovici ............... G06F 21/6227 713/193 |

(Continued)

FOREIGN PATENT DOCUMENTS

| JP | 2007-052698 A | 3/2007 |
| JP | 2010-061103 A | 3/2010 |

(Continued)

OTHER PUBLICATIONS

European Search Report dated Aug. 11, 2017 for European Patent Application No. 15737151.9.

(Continued)

*Primary Examiner* — Brandon S Hoffman
(74) *Attorney, Agent, or Firm* — Volpe and Koenig, P.C.

(57) ABSTRACT

A searchable encryption processing system includes a server including: a communication device to communicate with another device; a storage device configured to store as search target data, secret data obtained by concealing plaintext data, and a secret index obtained by concealing a plaintext index to classify the plaintext data; and an arithmetic device to execute a process including receiving, from a search client, a secret data query obtained by concealing a plaintext query, and a secret index query obtained by concealing a plaintext index, searching the storage device for a secret index matching the secret index query based on a predetermined searchable encryption technique, searching a secret data group classified by the matching secret index for secret data matching the secret data query, and returning the searched secret data to the search client.

13 Claims, 25 Drawing Sheets

(51) Int. Cl.
*G06F 16/35* (2019.01)
*G06F 16/33* (2019.01)
*H04L 9/00* (2006.01)
*H04L 9/08* (2006.01)

(56) References Cited

U.S. PATENT DOCUMENTS

| | | | | |
|---|---|---|---|---|
| 2009/0138698 A1* | 5/2009 | Chang | ................ | G06F 21/6218 |
| | | | | 713/150 |
| 2009/0300351 A1 | 12/2009 | Lei et al. | | |
| 2010/0146299 A1* | 6/2010 | Swaminathan | ... | G06F 17/30666 |
| | | | | 713/189 |
| 2012/0158734 A1* | 6/2012 | Chang | .................... | G06F 21/62 |
| | | | | 707/741 |
| 2013/0262852 A1* | 10/2013 | Roeder | ................ | H04L 9/0894 |
| | | | | 713/150 |

FOREIGN PATENT DOCUMENTS

| | | |
|---|---|---|
| JP | 201283863 A | 4/2012 |
| JP | 2013-130825 A | 7/2013 |
| JP | 2013-156675 A | 8/2013 |
| WO | 2005/114478 A2 | 12/2005 |
| WO | 2012/077541 A1 | 6/2012 |
| WO | 2013111284 A1 | 8/2013 |

OTHER PUBLICATIONS

Communication pursuant to Article 94(3) EPC dated Apr. 26, 2019 for European Patent Application No. 15737151.9.

\* cited by examiner

SEARCHABLE ENCRYPTION PROCESSING SYSTEM AND SEARCHABLE ENCRYPTION PROCESSING METHOD

TECHNICAL FIELD

The present invention relates to a searchable encryption processing system and a searchable encryption processing method, and particularly to a technique for a search processing system in a server-client model to enable a server to search deposited encrypted data without decrypting the encrypted data in response to a request from a client.

BACKGROUND ART

Examples of the technique of allowing a client to deposit data at a server and preventing information leak of the deposited data at the server in a server-client model include a search processing technique (refer to WO2012/077541) of performing, in accordance with a request from the client, a fast search of deposited encrypted data without decrypting the encrypted data nor performing a calculation with a heavy calculation load such as pairing.

This technique employs a probabilistic encryption method in which plaintext and encrypted text have a complicate one-to-m correspondence relation, the probabilistic encryption method being securer than a deterministic encryption method in which plaintext and encrypted text have a simple one-to-one correspondence relation. In this manner, the securer encryption method enables encrypted data to be searched without being decrypted, thereby preventing information leak from a server at which data is deposited, and allowing the server to securely search the deposited data.

SUMMARY OF INVENTION

Technical Problem

However, in the above-described conventional technique, all the pieces of deposited data need to be searched on a one-by-one basis to find pieces of encrypted data matching an encrypted search query, and this necessity may cause a problem in search processing on an encrypted data group having an enormous number of pieces of data at the server. Specifically, the number of searches is proportional to the number of pieces of encrypted data. For example, when a search database includes one hundred million pieces of encrypted data, one hundred million times of search operations are needed. Hence, as the number of pieces of deposited data increases, the procedure of search processing increases and an enormous time is required for the processing. For this reason, when a search based on the conventional technique is executed on an enormous number of pieces of encrypted data, it is difficult to complete the search processing within a realistic time (for example, within one second).

It is an object of the present invention to provide a technique capable of achieving speed-up of search processing of large volume data in a system in which a search for encrypted data is performed while a search query is kept encrypted.

Solution to Problem

To solve the problem described above, a searchable encryption processing system according to the present invention includes a server including: a communication device configured to communicate with another device; a storage device configured to store, as search target data, secret data obtained by concealing plaintext data, and a secret index obtained by concealing a plaintext index to classify the plaintext data; and an arithmetic device configured to execute a process including receiving, from a search client, a secret data query obtained by concealing a plaintext query, and a secret index query obtained by concealing a plaintext index, searching the storage device for a secret index matching the secret index query based on a predetermined searchable encryption technique, searching a secret data group classified by the matching secret index for secret data matching the secret data query, and returning the searched secret data to the search client.

A searchable encryption processing method according to the present invention is to be executed by an information processing device including a communication device configured to communicate with another device, and a storage device configured to store, as search target data, secret data obtained by concealing plaintext data and a secret index obtained by concealing a plaintext index to classify plaintext data. In this method, the information processing device executes a process including: receiving, from a search client, a secret data query obtained by concealing a plaintext query, and a secret index query obtained by concealing a plaintext index; searching the storage device for a secret index matching the secret index query based on a predetermined searchable encryption technique; searching a secret data group classified by the matching secret index for secret data matching the secret data query; and returning the searched secret data to the search client.

The present invention can achieve speed-up of search processing of large volume data in a system which performs a search for encrypted data while keeping a search query encrypted.

BRIEF DESCRIPTION OF DRAWINGS

For a more complete understanding of the present invention and the advantages thereof, reference is now made to the following description taken in conjunction with the accompanying drawings wherein.

DESCRIPTION OF EMBODIMENTS

Figure 1:
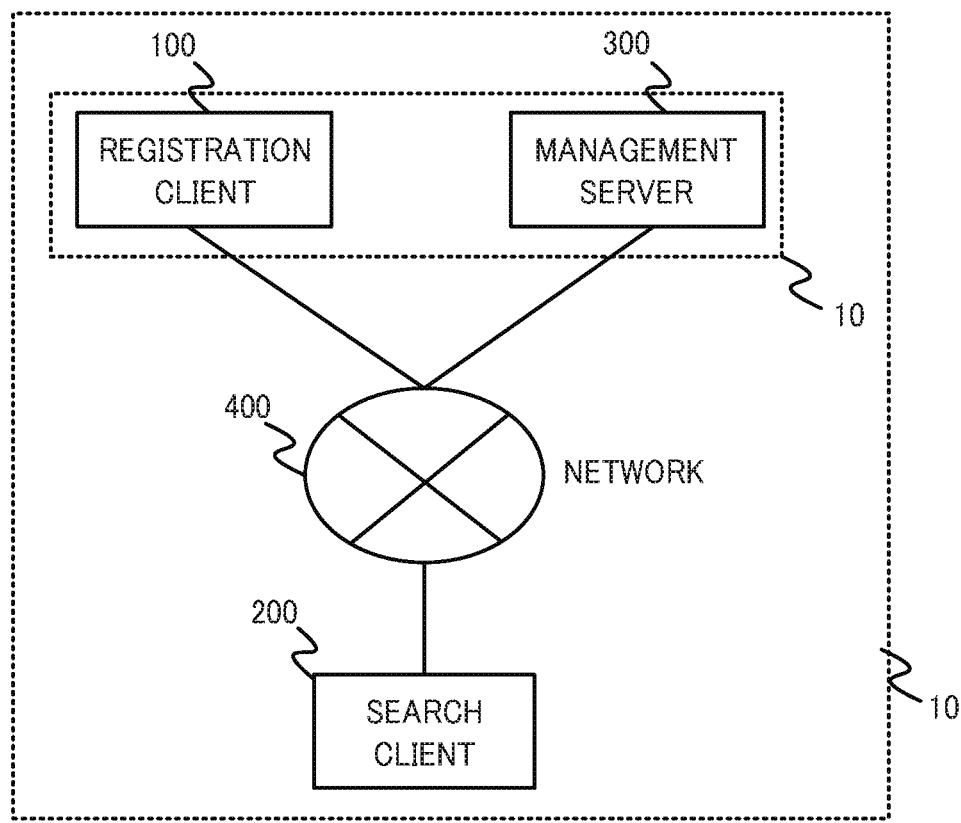
FIG. 1 is a configuration diagram of a network including a searchable encryption processing system according to one embodiment of the present invention.

Embodiments of the present invention will be described below in detail with reference to the accompanying drawings. FIG. 1 is a configuration diagram of a network including a searchable encryption processing system 10 according to the present embodiment. The searchable encryption processing system 10 illustrated in FIG. 1 is a computer system capable of achieving speed-up of search processing of large volume data in a system in which a search for encrypted data is performed while a search query is kept encrypted.

As illustrated in FIG. 1, the searchable encryption processing system 10 includes a registration client 100, a search client 200, and a management server 300. The registration client 100 and the management server 300 are configured to mutually communicate information through a network 400. The search client 200 and the management server 300 are configured to mutually communicate information via the network 400. The configuration of the searchable encryption processing system 10 in FIG. 1 includes all of the registration client 100, the search client 200, and the management server 300. The searchable encryption processing system 10, however, may include only the management server 300 as a minimum configuration of the searchable encryption processing system 10, or only the registration client 100 and the management server 300.

The registration client 100 according to the present embodiment serves as a data registration communication device configured to transmit, to the management server 300, data (hereinafter referred to as secret data) obtained by concealing plaintext, and data (hereinafter referred to as a secret index) obtained by concealing an index for classifying plaintext, and to register both data in the management server 300. The search client 200 serves as a search communication device configured to transmit a concealed plaintext query (hereinafter referred to as a secret query) to the management server 300 and receive a search result returned from the management server 300. The management server 300 serves as a communication device configured to store the secret data and the secret index transmitted from the registration client 100 described above and search the secret data in response to a request from the search client 200.

The following describes a functional configuration of each device included in the searchable encryption processing system 10 according to the present embodiment. As described above, a function described below is implemented by, for example, executing a computer program stored in each device included in the searchable encryption processing system 10.

Figure 2:
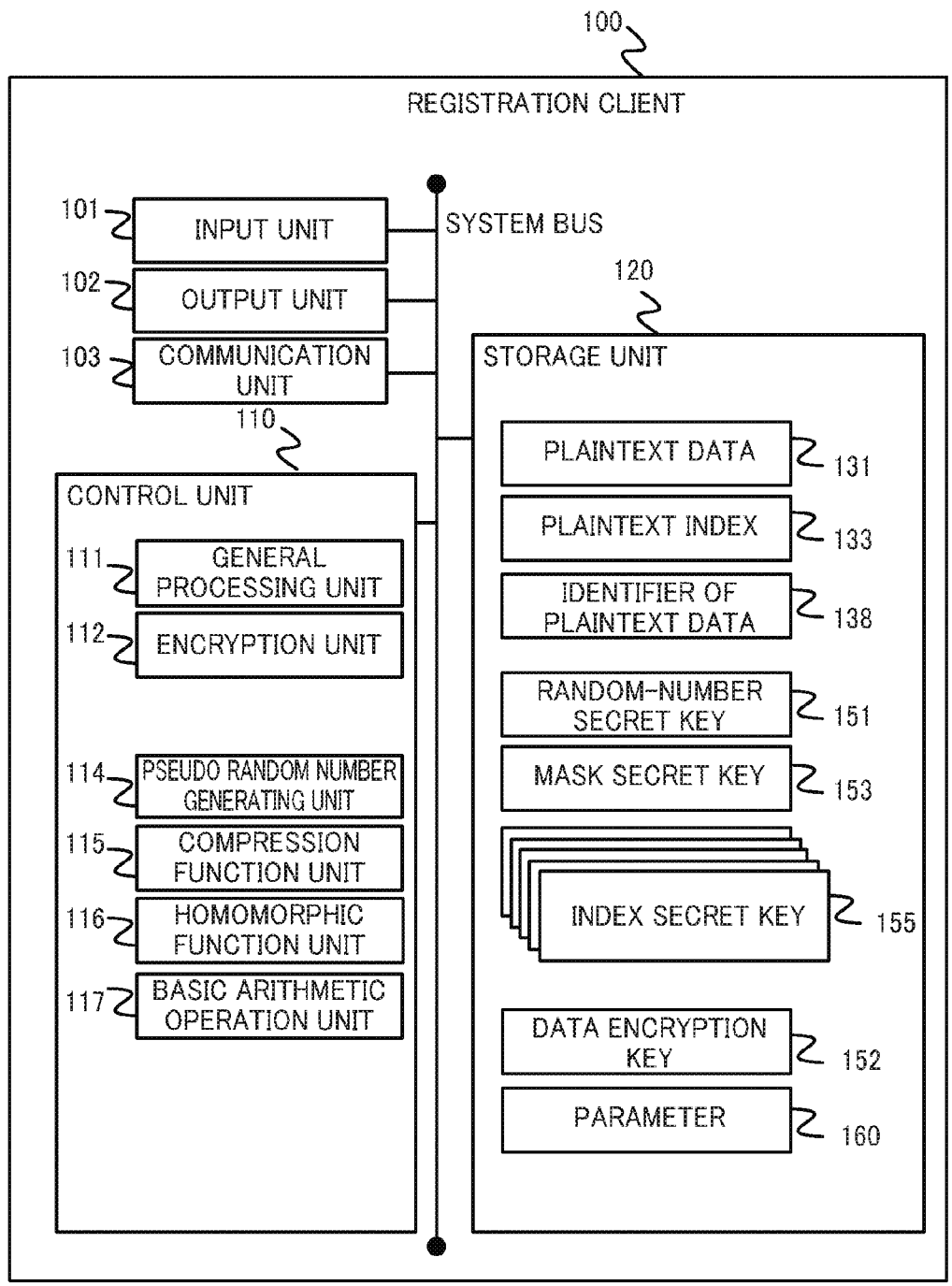
FIG. 2 is a diagram schematically illustrating an example of a function of a registration client.

FIG. 2 is a diagram schematically illustrating the function of the registration client 100 according to the present embodiment. The registration client 100 included in the searchable encryption processing system 10 according to the present embodiment includes a control unit 110, a storage unit 120, an input unit 101, an output unit 102, and a communication unit 103.

The storage unit 120 stores plaintext data 131 received through the input unit 101 and an identifier 138 of the plaintext data. The storage unit 120 also stores a plaintext index 133 produced from the plaintext data 131. The storage unit 120 also stores, as data to be secretly managed by the registration client 100 from a perspective of information security, a random number secret key 151, a data encryption key 152, a mask secret key 153, and a plurality of index secret keys 155. The storage unit 120 also stores a parameter 160 as data used to produce secret data and secret index based on the plaintext data 131 and the plaintext index 133.

The control unit 110 includes a general processing unit 111, an encryption unit 112, a pseudo random number generating unit 114, a compression function unit 115, a homomorphic function unit 116, and a basic arithmetic operation unit 117. The general processing unit 111 controls all pieces of processing at the registration client 100. For example the general processing unit 111 performs processing of storing information received through the input unit 101 as the plaintext data 131 in the storage unit 120. The general processing unit 111 also performs processing of displaying the plaintext data 131 on the output unit 102. The general processing unit 111 also performs processing of reading the plaintext data 131 stored in the storage unit 120, inputting the read plaintext data 131 to the encryption unit 112, the pseudo random number generating unit 114, the compression function unit 115, the homomorphic function unit 116, and the basic arithmetic operation unit 117, and storing output data as secret data in the storage unit 120. The general processing unit 111 also performs processing of transmitting the secret data described above to the management server 300 through the communication unit 103.

The encryption unit 112 performs processing of encrypting input data. The encryption unit 112 performs, for example, processing of outputting encrypted data based on the plaintext data 131 and the random number secret key 151 inputted from the general processing unit 111. The encryption unit 112 is achieved by, for example, implementing a typical encryption algorithm.

The pseudo random number generating unit 114 performs processing of outputting a pseudo random number. The pseudo random number generating unit 114 is achieved by, for example, implementing a typical pseudo random number generating algorithm. The pseudo random number generating unit 114 according to the present embodiment outputs a pseudo random number using the random number secret key 151 input from the general processing unit 111. A data value of the random number secret key 151 is updated to a new data value each time the pseudo random number generating unit 114 generates a pseudo random number.

The compression function unit 115 performs processing of outputting data obtained by irreversibly compressing input data. The compression function unit 115 converts, for example, data input from the general processing unit 111 into another data of a fixed length. For example, the compression function unit 115 configured to convert input data of an optional length into data of 256 bits can be achieved by implementing the SHA-256 function, which is a typical cryptographic hash function algorithm.

The homomorphic function unit 116 performs processing of outputting, as data, an output result of a function having a homomorphic property for input data. However, a function (hereinafter referred to as a homomorphic function) having a homomorphic satisfies:

$$F(x[\text{dot}]y)=F(x)?F(y) \quad (1)$$

for a function F, an input variable x, and an input variable y. In the expression, "[dot]" and "?" are operation symbols to be substituted by, for example, an addition operation symbol +, a multiplication operation symbol *, and a bitwise exclusive OR (XOR) calculation operation symbol xor.

When "[dot]" and "?" in Expression 1 above are substituted by the XOR operation symbol xor, Expression 2 below is obtained.

$$F(x \text{ xor } y)=F(x)\text{xor } F(y) \quad (2)$$

The basic arithmetic operation unit 117 performs processing related to basic arithmetic operations such as addition, subtraction, comparison, AND, OR, and XOR. For example, the basic arithmetic operation unit 117 performs processing of outputting, as data, an XOR calculation of the bitwise exclusive OR of two pieces of data input from the general processing unit 111, and a result of examination of equality in a comparison operation thereof.

Figure 5:
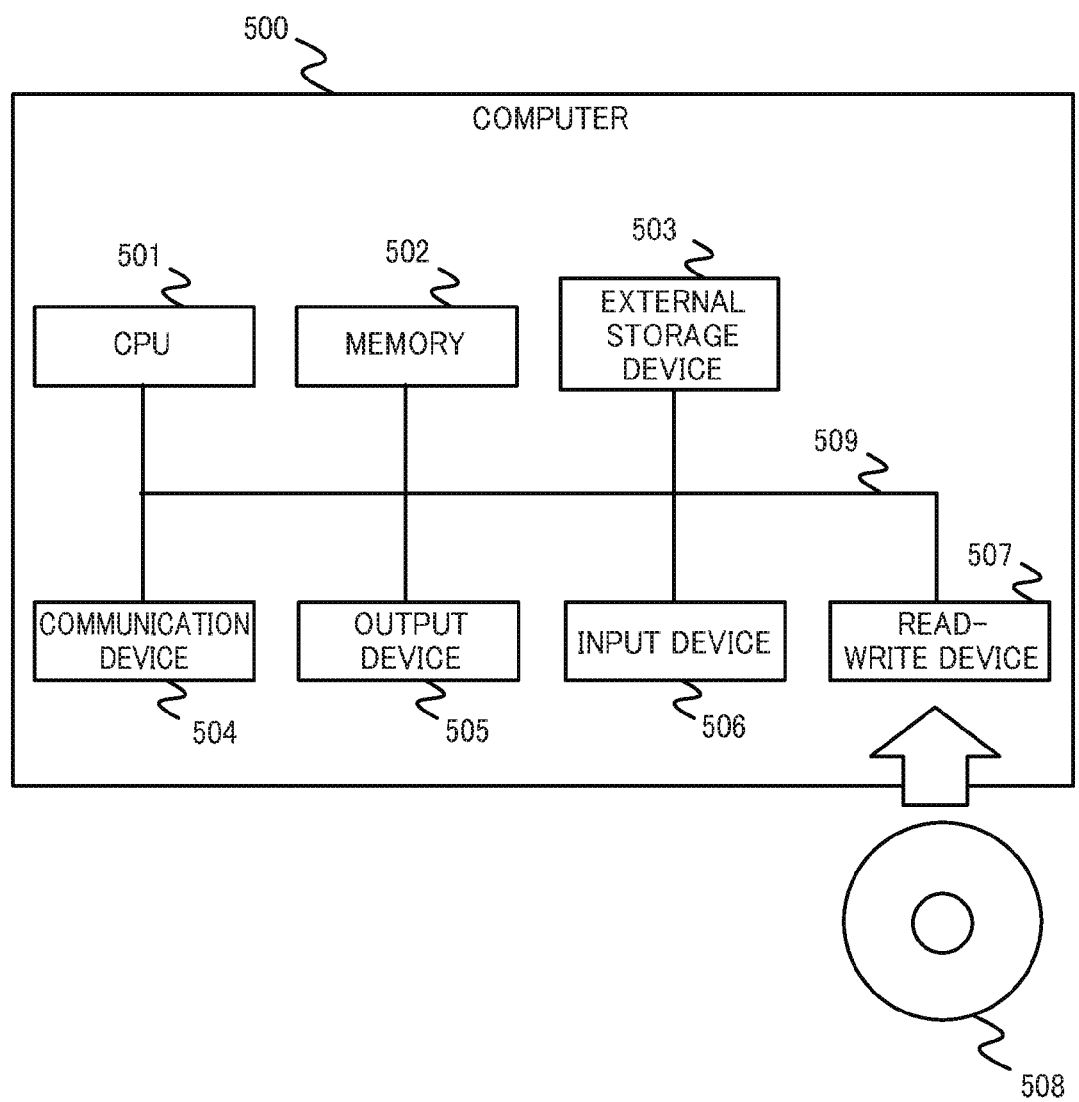
FIG. 5 is a diagram illustrating an exemplary hardware configuration of a computer.

The registration client 100 described above can be achieved by, for example, a typical computer 500 including, as illustrated in FIG. 5, a central processing unit (CPU) 501 as an arithmetic device, a memory 502, an external storage device 503 such as a hard disk drive (HDD), a read-write device 507 configured to read and write information from and to a portable storage medium 508 such as a Compact Disk (CD) or a Digital Versatile Disk (DVD), an input device 506 such as a keyboard or a mouse, and an output device 505 such as a display, a communication device 504 such as a network interface card (NIC) for coupling with the network 400, and an internal communication line (system bus) 509 such as a system bus coupling these devices.

For example, the storage unit 120 is achievable by the CPU 501 using the memory 502 or the external storage device 503. The control unit 110 and each processing unit included in the control unit 110 is achievable by the CPU 501 executing a predetermined computer program stored in the external storage device 503 and loaded onto the memory 502. The input unit 101 is achievable by the CPU 501 using the input device 506, and the output unit 102 is achievable by the CPU 501 using the output device 505. The communication unit 103 is achievable by the CPU 501 using the communication device 504.

The above-described predetermined computer program may be stored (downloaded) into the external storage device 503 from the storage medium 508 through the read-write device 507 or from the network 400 through the communication device 504, and then may be loaded onto the memory 502 and executed by the CPU 501 at a desirable timing. Alternatively, the predetermined computer program may be directly loaded onto the memory 502 from the storage medium 508 through the read-write device 507 or from the network 400 through the communication device 504, and then executed by the CPU 501.

Figure 3:
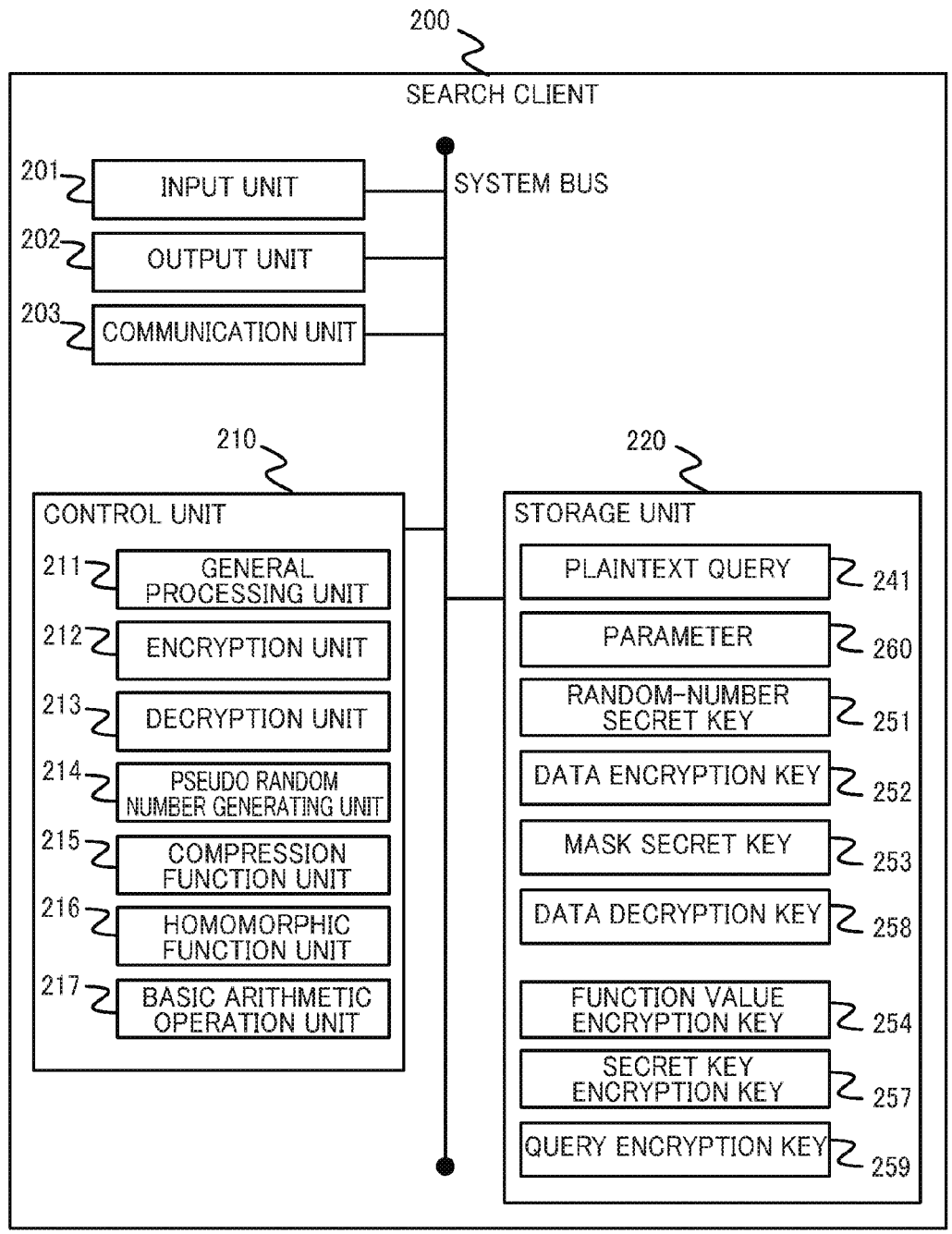
FIG. 3 is a diagram schematically illustrating an example of a function of a search client.

The following describes the search client 200. FIG. 3 is a diagram schematically illustrating the function of the search client 200 according to the present embodiment. As illustrated in FIG. 3, the search client 200 includes a control unit 210, a storage unit 220, an input unit 201, an output unit 202, and a communication unit 203.

The storage unit 220 stores a random number secret key 251, and a parameter 260 as data used to produce secret data and a secret index, which serve in the same manner as those stored in the storage unit 120 of the registration client 100. The storage unit 220 also stores a data encryption key 252 used to encrypt data, a mask secret key 253, a data decryption key 258, a function value encryption key 254, a secret key encryption key 257, and a query encryption key 259.

The control unit 210 includes a general processing unit 211, an encryption unit 212, a decryption unit 213, a pseudo random number generating unit 214, a compression function unit 215, a homomorphic function unit 216, and a basic arithmetic operation unit 217.

The general processing unit 211 controls all processing at the search client 200, similarly to the general processing unit 111 of the registration client 100 described above.

The encryption unit 212 performs processing of outputting encrypted data of input data, similarly to the encryption unit 112 of the registration client 100 described above.

The decryption unit 213 performs processing of decrypting encrypted data using input data. The decryption unit 213 is achieved by implementing, for example, a typical decryption algorithm.

The pseudo random number generating unit 214 performs processing of outputting a pseudo random number, similarly to the pseudo random number generating unit 114 of the registration client 100 described above. The compression function unit 215 performs processing of outputting data obtained by irreversibly compressing input data, similarly to the compression function unit 115 of the registration client 100 described above.

The homomorphic function unit 216 performs processing of outputting, as data, an output result of a homomorphic function for input data, similarly to homomorphic function 116 of the registration client 100 described above. The basic arithmetic operation unit 217 performs processing related to basic arithmetic operation, similarly to the basic arithmetic operation unit 117 of the registration client 100 described above.

The search client 200 described above can be achieved by the typical computer illustrated in FIG. 5, similarly to the registration client 100.

Figure 4:
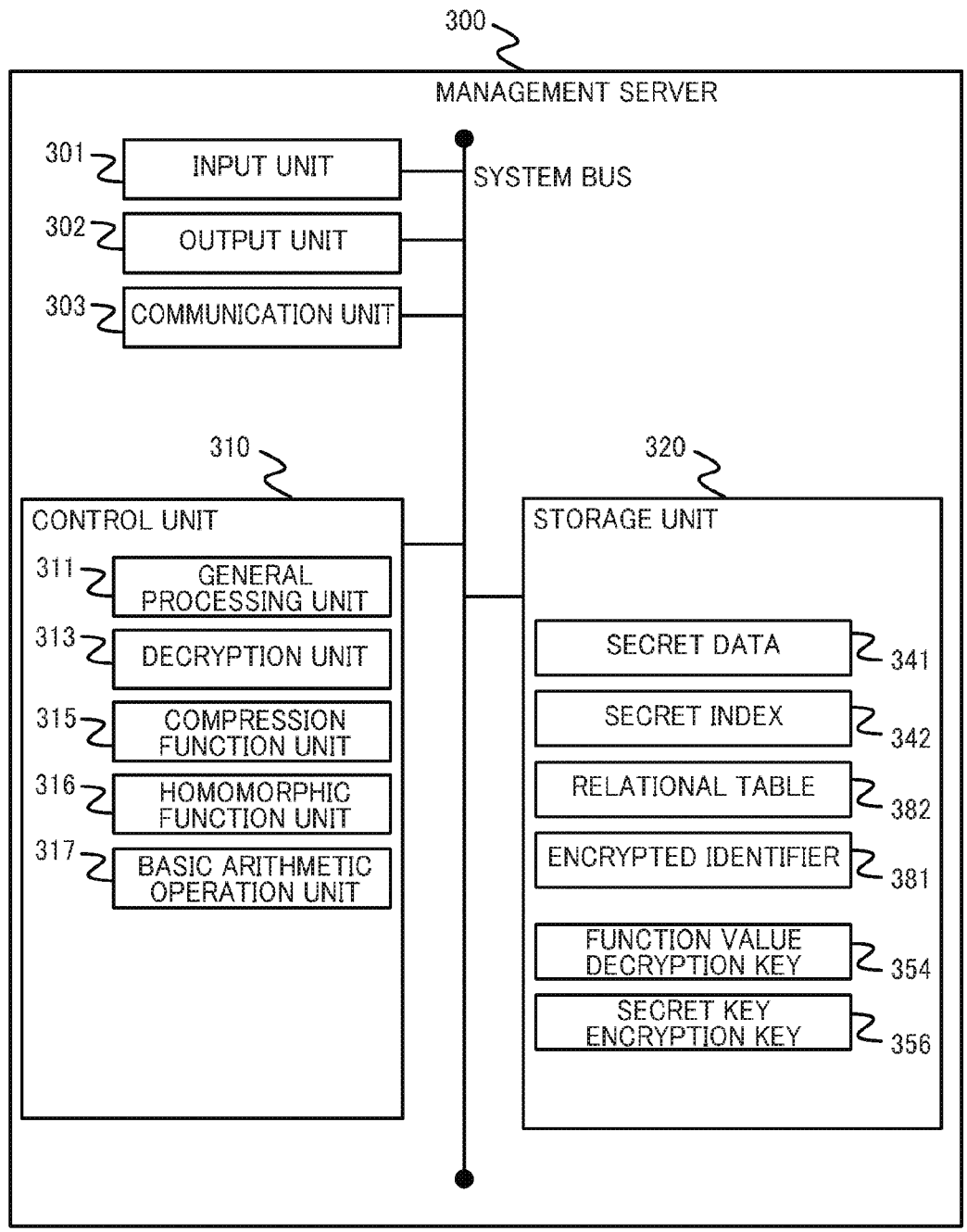
FIG. 4 is a diagram schematically illustrating an example of a function of a management server.

The following describes the management server 300. FIG. 4 is a diagram schematically illustrating the function of the management server 300 according to the present embodiment. As illustrated in FIG. 4, the management server 300 according to the present embodiment includes a control unit 310, a storage unit 320, an input unit 301, an output unit 302, and a communication unit 303.

The storage unit 320 stores secret data 341, a secret index 342, a relational table 382, an encrypted identifier 381, a function value decryption key 354, and a secret key encryption key 356.

The control unit 310 includes a general processing unit 311, a decryption unit 313, a compression function unit 315, a homomorphic function unit 316, and a basic arithmetic operation unit 317.

The general processing unit 311 controls all processing at the management server 300, similarly to the general processing unit 111 of the registration client 100 described above. The decryption unit 313 performs processing of decrypting encrypted data, similarly to the decryption unit 213 of the search client 200 described above.

the compression function unit 315 performs processing of outputting data obtained by irreversibly compressing input data, similarly to the compression function unit 115 of the registration client 100 described above.

The homomorphic function unit 316 performs processing of outputting, as data, an output result of a homomorphic function for input data, similarly to the homomorphic function unit 116 of the registration client 100 described above.

The basic arithmetic operation unit 317 performs processing related to basic arithmetic operations, similarly to the basic arithmetic operation unit 117 of the registration client 100 described above.

The search client 200 described above can be achieved by the typical computer illustrated in FIG. 5, similarly to the registration client 100.

Figure 6:
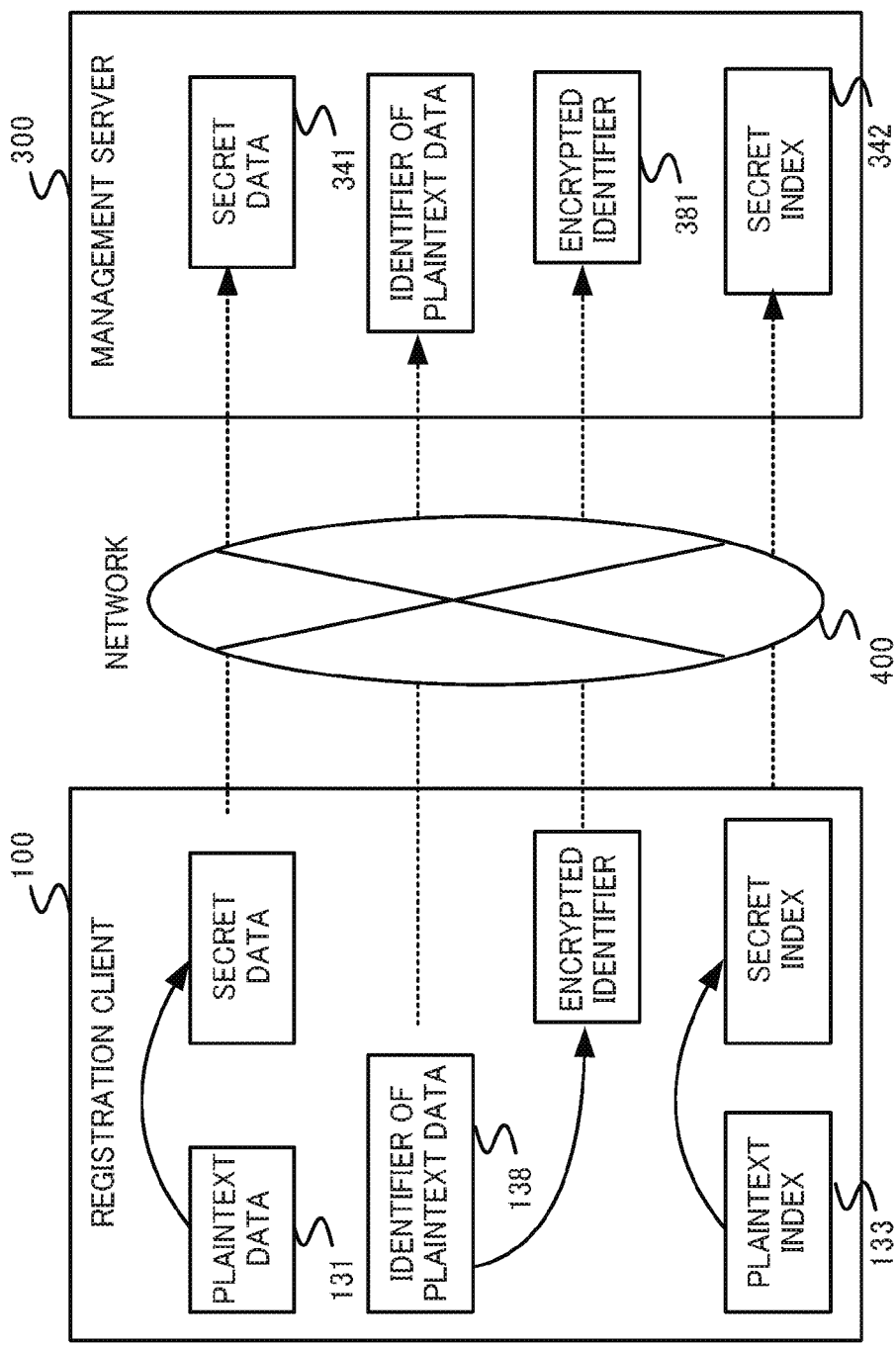
FIG. 6 is a diagram illustrating an example of an overview of the procedure of processing between the registration client and the management server.

The following schematically describes a searchable encryption processing method according to the present embodiment. FIG. 6 is a diagram illustrating an overview of the procedure of processing between the registration client 100 and the management server 300 according to the present embodiment. In this example, the registration client 100 sets information input by a user through the input unit 101 as the plaintext data 131, and stores this plaintext data 131 together with the identifier 138 thereof in the storage unit 120. The registration client 100 generates secret data by concealing the plaintext data 131 described above, and transmits, through the communication unit 103, a pair of this secret data and the identifier 138 of the plaintext data to the management server 300 via the network 400.

The management server 300 receives, through the communication unit 303, the secret data and the identifier 138 of the plaintext data, and produces the relational table 382 that is a conversion table of the address of the secret data and the identifier 138 of the plaintext data, and then stores the secret data and the relational table 382 in the storage unit 320.

The registration client 100 obtains a secret index by concealing the plaintext index 133 stored in the storage unit 120 and also an encrypted identifier by encrypting the identifier 138 of the plaintext data, and transmits, through the communication unit 103, the secret index and the encrypted identifier to the management server 300 via the network 400. The management server 300 receives the secret index and the encrypted identifier and stores the secret index and the encrypted identifier in the storage unit 320.

Figure 7:
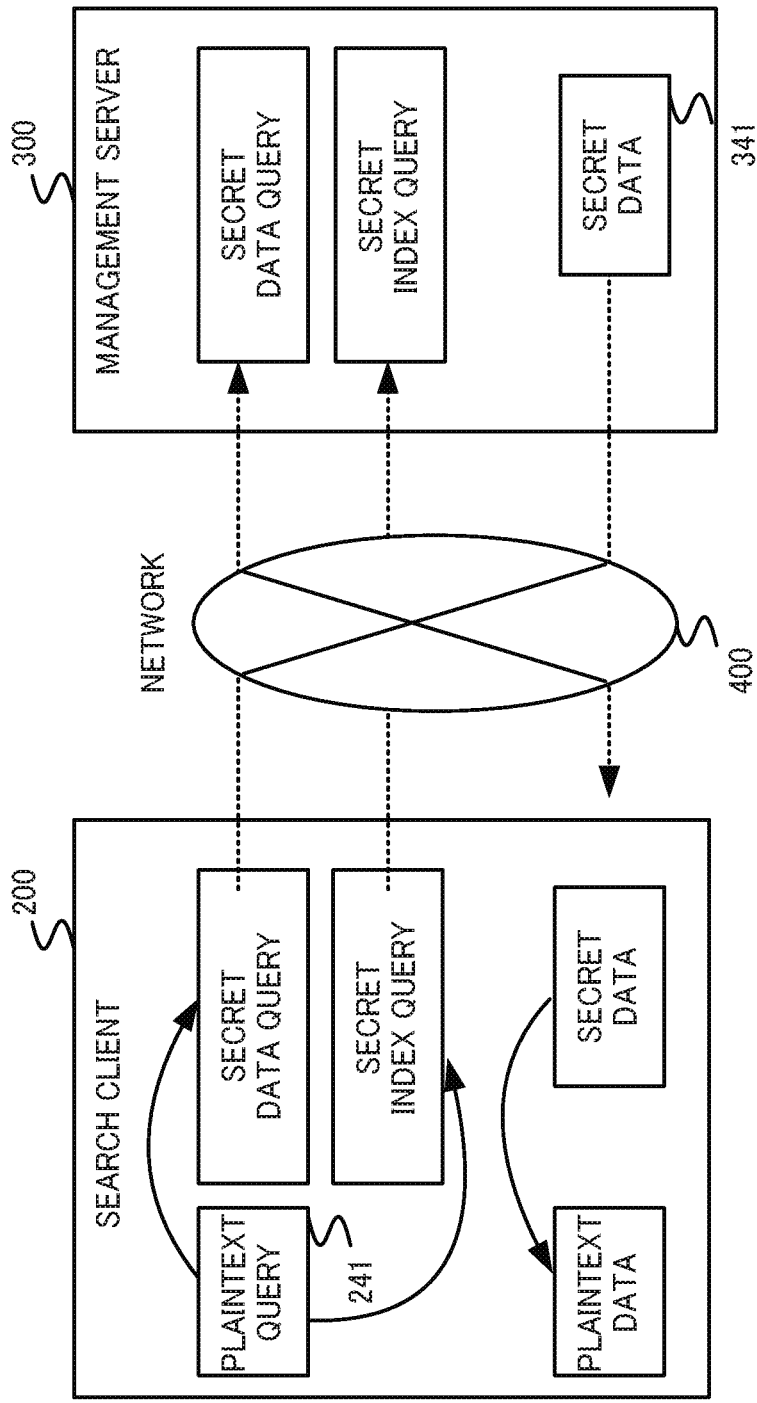
FIG. 7 is a diagram illustrating an example of an overview of the procedure of processing between the search client and the management server.

FIG. 7 is a diagram illustrating an overview of the procedure of processing between the search client 200 and the management server 300 according to the present embodiment. FIG. 7 illustrates an overview of search processing executed at the management server 300 in response to a request from the search client 200. In this example, the search client 200 sets information input by a user as a plaintext query 241 and stores the plaintext query 241 in the storage unit 120.

The search client 200 generates a secret data query and a secret index query based on the plaintext query 241, and transmits, through the communication unit 103, the secret data query and the secret index query to the management server 300 via the network 400. The management server 300 receives, through the communication unit 303, the secret data query and the secret index query, and stores the secret data query and the secret index query in the storage unit 320.

The management server 300 searches for a secret index matching the secret index query using the secret index stored in the storage unit 320, and also searches for secret data matching the secret data query, and then transmits, through the communication unit 303, the secret data as a search result to the search client 200 via the network 400. The search client 200 decrypts the secret data transmitted from the management server 300 to obtain plaintext data.

Figure 8:
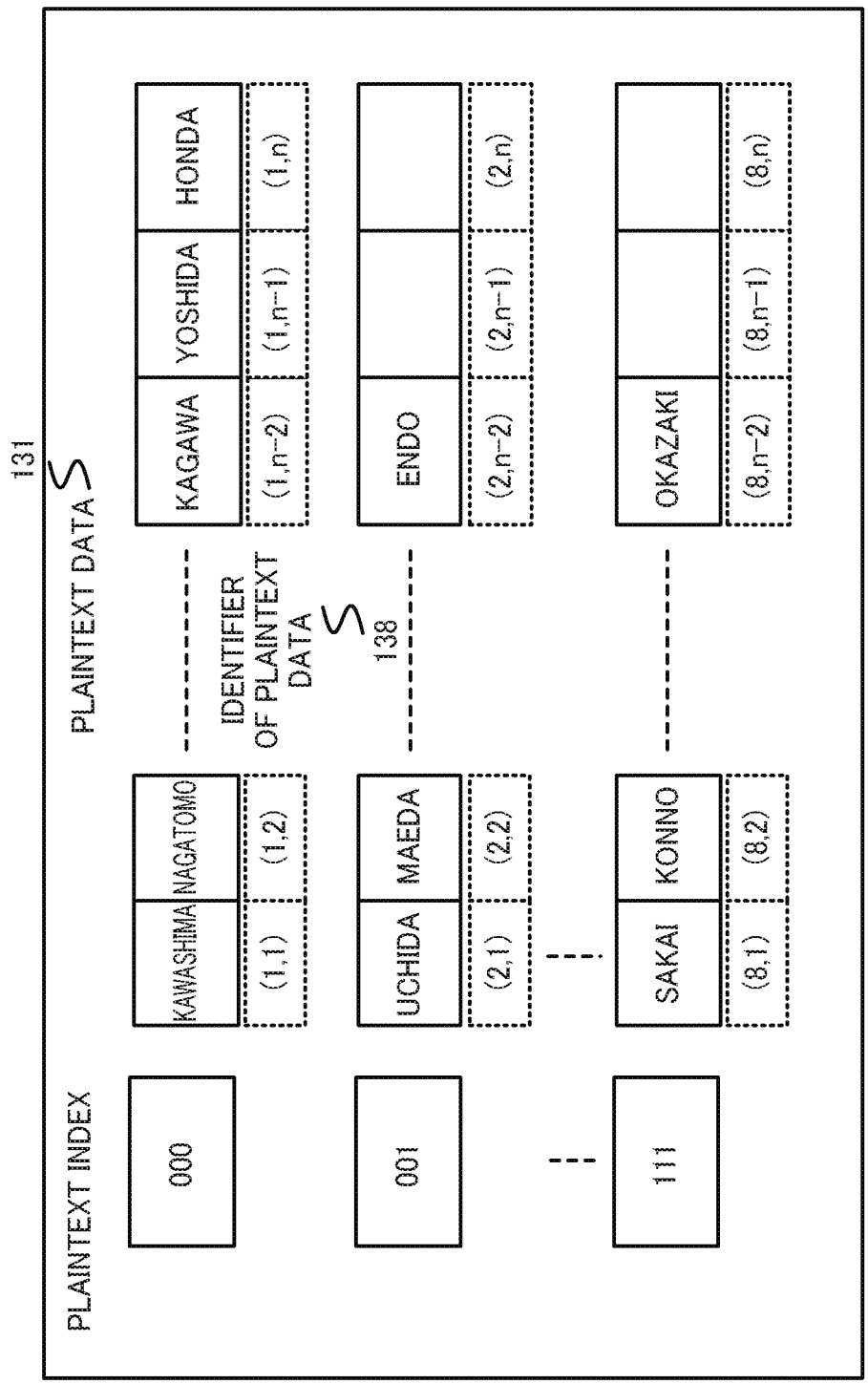
FIG. 8 is a diagram illustrating examples of a plaintext index, a plaintext data, and an identifier of the plaintext data.

The following describes a relation among plaintext data, a plaintext index, and an identifier of the plaintext data. FIG. 8 illustrates an exemplary relation between the plaintext data and the plaintext index. The plaintext index according to the present embodiment has the relation with the plaintext data directly or indirectly defined by the registration client 100, and in the example in FIG. 8, the plaintext data is grouped based on the lowest three bits of a hash value of the plaintext data. This example has eight kinds of plaintext indices (eight kinds of "000" to "111" in binary notation), and n pieces of the plaintext data 131 at maximum are grouped depending on the value of a plaintext index. For example, with a plaintext index having the value of "000", n pieces of plaintext data (Kawashima, Nagatomo, . . . , Kagawa, Yoshida, and Honda) are classified into one group. Similarly, with a plaintext index having the value of "001", (n−2) pieces of plaintext data (Uchida, Maeda, . . . , Endo) are classified into one group. The identifier 138 of the plaintext data is an ID (or data address) pointing to each plaintext data 131. For example, the plaintext data of "Kawashima" has an identifier of (1, 1), and the plaintext data of "Nagatomo" has an identifier of (1, 2).

From a perspective of information security, the number of pieces of the plaintext data 131 corresponding to a plaintext index is desirably the same between plaintext indices. Thus, the registration client 100 may generate a random number for a plaintext index having less than n pieces of plaintext data and add the random number as plaintext data or secret data so that n pieces of plaintext data are associated with each plaintext index. In this case, the number of pieces of plaintext data corresponding to each plaintext index is constant, and thus the popularity of the plaintext index will not be externally leaked (a plaintext index having a larger number of pieces of plaintext data is likely to be a search target, and when this happens, it is easily guessed that the index includes useful data). The addition does not need to be performed in such a manner that each index is associated with n pieces of plaintext data, and the addition may be unequal for each index.

The registration client 100 may associate, instead of adding a random number as plaintext data associated with a plaintext index, identical plaintext data with a plurality of plaintext indices, for example, may associate "Kawashima" with three kinds of plaintext indices of "000", "001", and "010". In this case, only the plaintext data of "Kawashima" matching the plaintext index of "000" is reflected on a search result.

The method of producing a plaintext index at the registration client 100 may use, for example, a bit at an optional digit of the hash value, in place of the method of applying plaintext data to a hash function to acquire a hash value and adopting the lowest three bits of the hash value as the value of the index as exemplarily described above. Alternatively, another function may be used in place of the hash function.

For example, n-gram may be used to divide plaintext data at a constant data length and set the divided data as a plaintext index.

Figure 9:
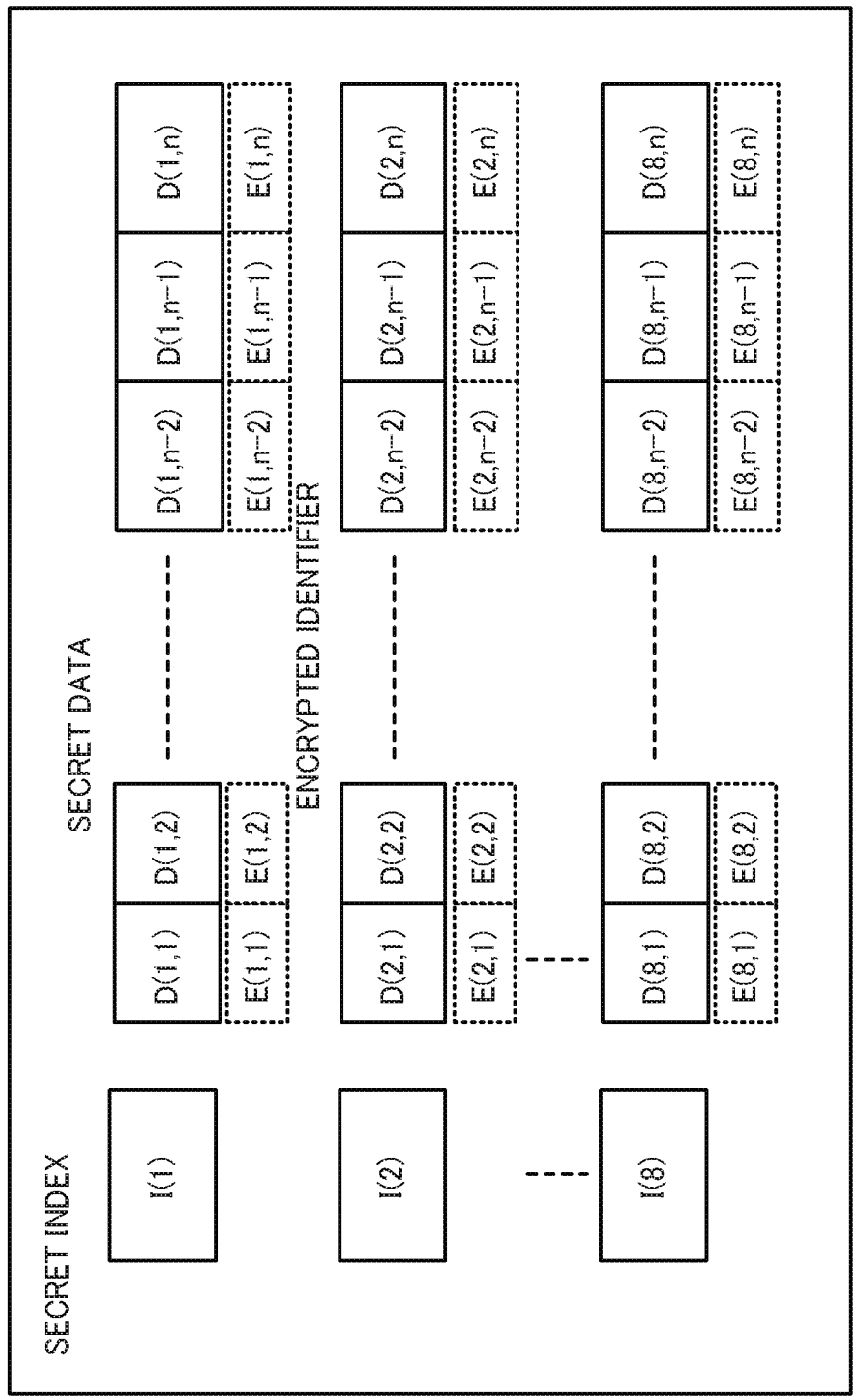
FIG. 9 is a diagram illustrating examples of a secret index, secret data, and an encrypted identifier.

The following describes a relation among secret data, a secret index, and an encrypted identifier. FIG. 9 illustrates an exemplary relation between secret data obtained by concealing plaintext data and a secret index obtained by concealing a plaintext index. In this example, in the registration client 100, I(1) represents a secret index obtained by concealing the value "000" of a plaintext index, and similarly, I(8) represents a secret index obtained by concealing the value "111" of a plaintext index. D(1, 1) represents secret data obtained by concealing plaintext data having the value of "Kawashima", and similarly, D(1, n) represents secret data obtained by concealing plaintext data having the value of "Honda". The registration client 100 sets a random number as secret data for plaintext data having no value (which appears as if the same number of pieces of secret data are grouped for each secret index). The registration client 100 encrypts the identifier of each piece of plaintext data and stores the encrypted identifier in the storage unit 120. The registration client 100 encrypts the address of, for example, the identifier (1, 1) of plaintext data and stores the encrypted address in the storage unit 120.

Figure 10:
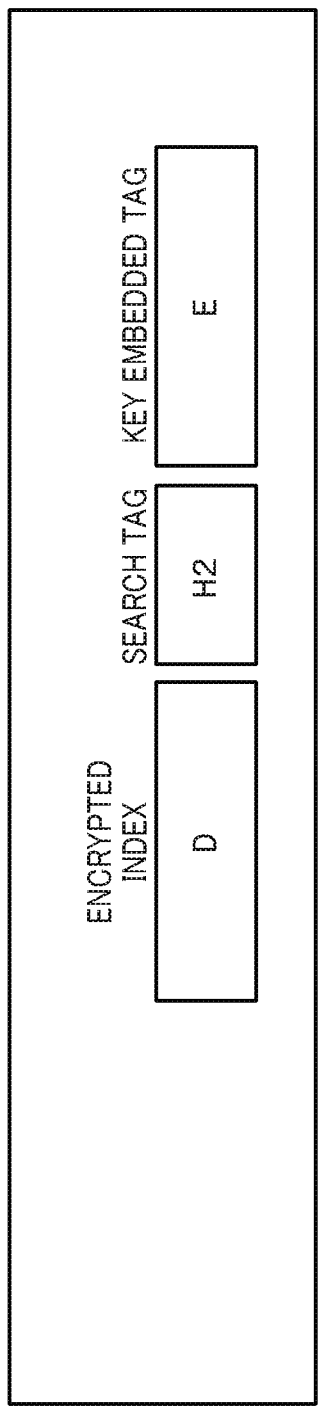
FIG. 10 is a diagram illustrating an example of an overview of the secret index.
Figure 11:
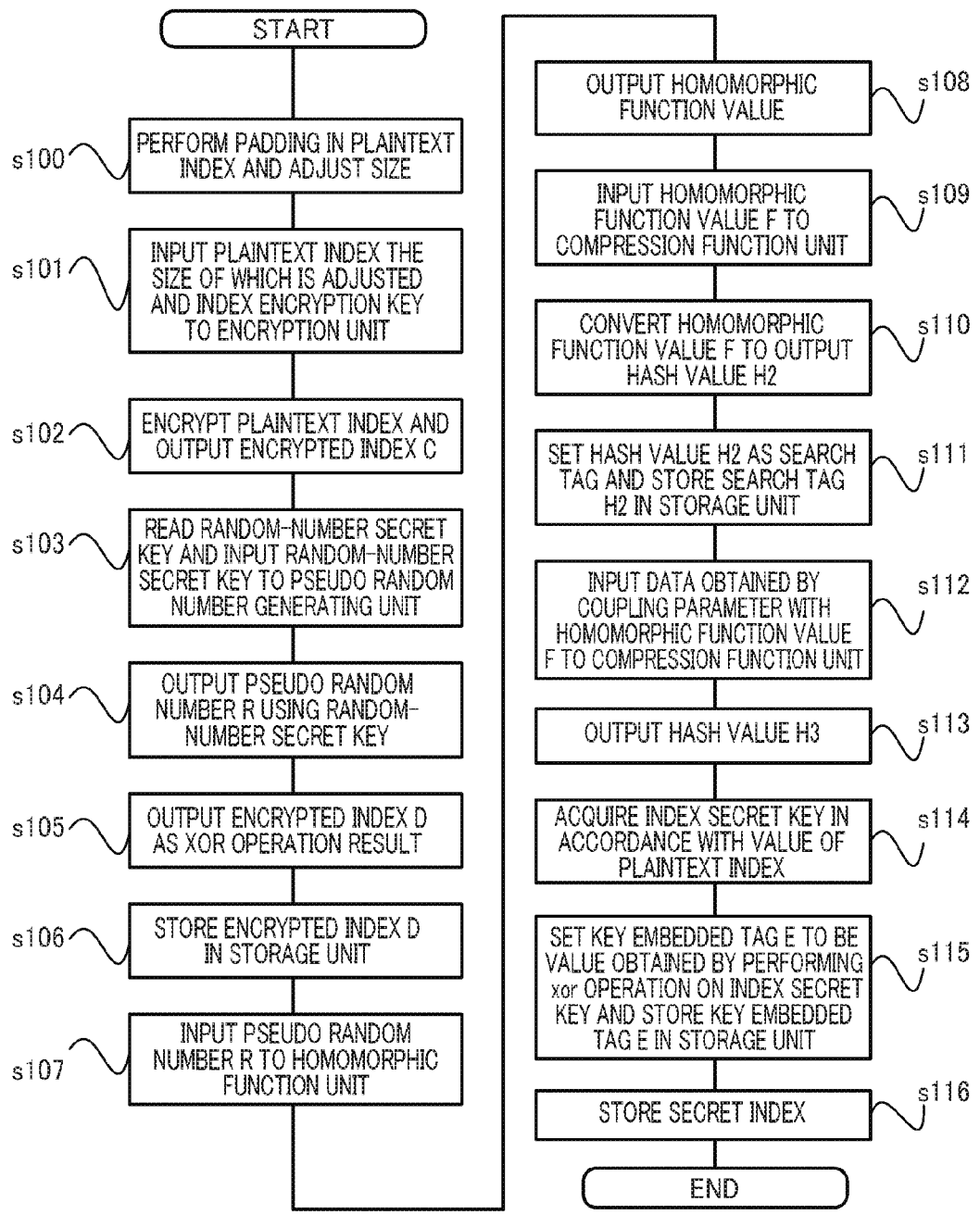
FIG. 11 is a flowchart of exemplary processing procedure 1 of a searchable encryption processing method.

The following describes the procedure of configuring a secret index by the registration client 100. FIG. 10 is a diagram illustrating an overview of a secret index according to the present embodiment. FIG. 11 is a flowchart of exemplary processing procedure 1 of the searchable encryption processing method according to the present embodiment. In this procedure, the general processing unit 111 of the registration client 100 reads the parameter 160 stored in the storage unit 120, pads the zero value (binary) in the plaintext index 133, and adjusts the size of the plaintext index 133 (s100). The general processing unit 111 inputs the plaintext index 133 the size of which is adjusted and the index secret key 155 read from the storage unit 120 to the encryption unit 112 (s101).

The encryption unit 112 of the registration client 100 encrypts the plaintext index 133 acquired from the general processing unit 111 described above, and outputs an encrypted index C (s102).

The general processing unit 111 of the registration client 100 reads the random-number secret key 151 from the storage unit 120, and inputs the random-number secret key 151 to the pseudo random number generating unit 114 (s103). The pseudo random number generating unit 114 outputs a pseudo random number R using the random-number secret key 151 input from the general processing unit 111 (s104). The general processing unit 111 stores the pseudo random number R as an initial vector IV in the storage unit 120.

Subsequently, the basic arithmetic operation unit 117 of the registration client 100 sets the encrypted index C and the pseudo random number R described above as two inputs, and outputs an encrypted index D as a result of the XOR operation of the inputs (s105). The general processing unit 111 stores the encrypted index D in the storage unit 120 (s106). In this case, Expression 3 below is satisfied by the encrypted index C, the pseudo random number R, and the encrypted index D.

$$D = C \text{ xor } R \quad (3)$$

The general processing unit 111 of the registration client 100 inputs the pseudo random number R described above to the homomorphic function unit 116 (s107). The homomorphic function unit 116 outputs a homomorphic function value as an output value of data having a homomorphic property for the hash value of the input pseudo random number R (s108). When func represents the homomorphic function, Expression 4 below is satisfied by a hash value H1 of the pseudo random number R as an input thereto, and a homomorphic function value F as an output therefrom.

$$F = \text{func}(H1) \quad (4)$$

The general processing unit 111 of the registration client 100 inputs the homomorphic function value F described above to the compression function unit 115 (s109). The compression function unit 115 converts the homomorphic function value F to output a hash value H2 (s110). The general processing unit 111 sets the hash value H2 as a search tag and stores this search tag H2 in the storage unit 120 (s111).

The general processing unit 111 of the registration client 100 calls the parameter 160 from the storage unit 120 and inputs, to the compression function unit 115, data obtained by coupling the parameter 160 with the homomorphic function value F described above (s112). Then, the compression function unit 115 converts the homomorphic function value F and a parameter PA thus coupled, and outputs a hash value H3 (s113). When hash represents the compression function, Expression 5 below is satisfied by the parameter PA, the homomorphic function value F, and the output hash value H3.

$$H3 = \text{hash}(F \| PA) \quad (5)$$

Then, the general processing unit 111 acquires the index secret keys 155 in accordance with the value of the plaintext index 133 (s114). Basically, the same index secret key 155 is used for one plaintext index 133, and different index secret keys 155 are used for plaintext index having different values.

The general processing unit 111 sets a key embedded tag E to be a value obtained by performing the xor operation on the index secret key 155 stored in the storage unit 120 for the hash value H3 described above, and stores the key embedded tag E in the storage unit 120 (s115). Expression 6 below is satisfied by an index secret key IK, the hash value H3, and the key embedded tag E.

$$E = IK \text{ xor } H3 \quad (6)$$

Subsequently, the general processing unit 111 of the registration client 100 sets a secret index to be data obtained by coupling the encrypted index D, the search tag H2, and the key embedded tag E, which are acquired through the above-described processing, and stores the secret index in the storage unit 120 (s116). The above-described processing procedure may be executed in a different order.

Figure 12:
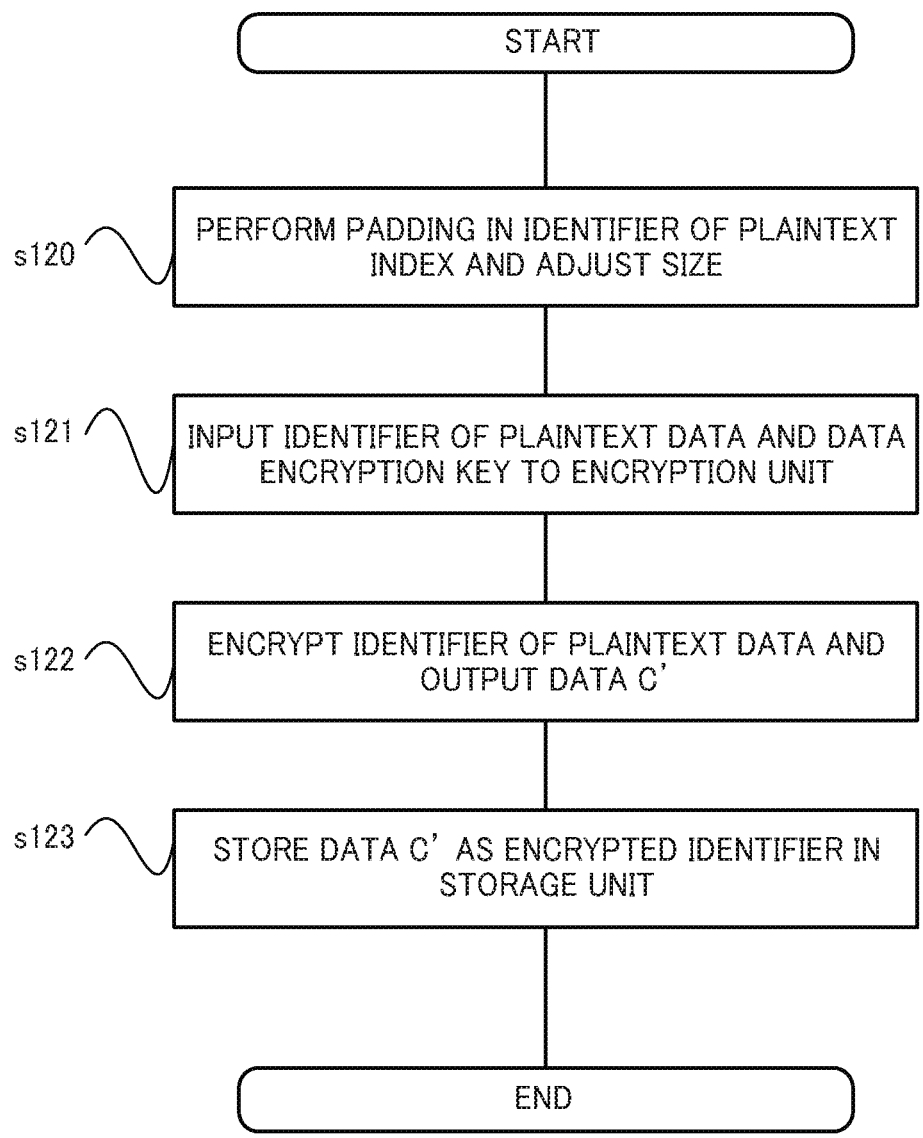
FIG. 12 is a flowchart of exemplary processing procedure 2 of the searchable encryption processing method.

The following describes a method of configuring an encrypted identifier. FIG. 12 is a flowchart of exemplary processing procedure 2 of the searchable encryption processing method according to the present embodiment. In this procedure, the general processing unit 111 of the registration client 100 reads the parameter 160 stored in the storage unit 120, pads the zero value (binary) in the identifier 138 of the plaintext data, and adjusts the size of the data (s120). The general processing unit 111 inputs the identifier 138 of the plaintext data described above and, for example, the data encryption key 152 read from the storage unit 120 to the encryption unit 112 (s121).

The encryption unit 112 of the registration client 100 encrypts the identifier 138 of the plaintext data and outputs data C' (s122). The general processing unit 111 stores data C' as an encrypted identifier in the storage unit 120 (s123). The padding described above may be performed by another padding method in place of the writing of the zero value. For example, another constant or a random number may be added.

Figure 13:
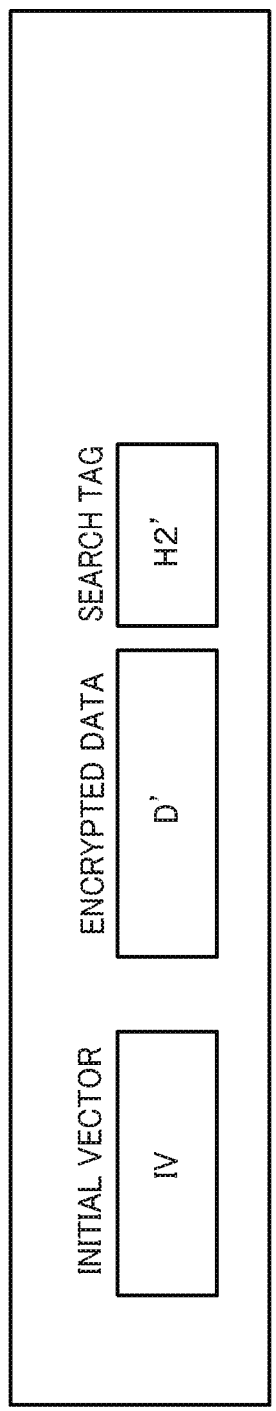
FIG. 13 is a diagram illustrating an example of an overview of the secret data.
Figure 14:
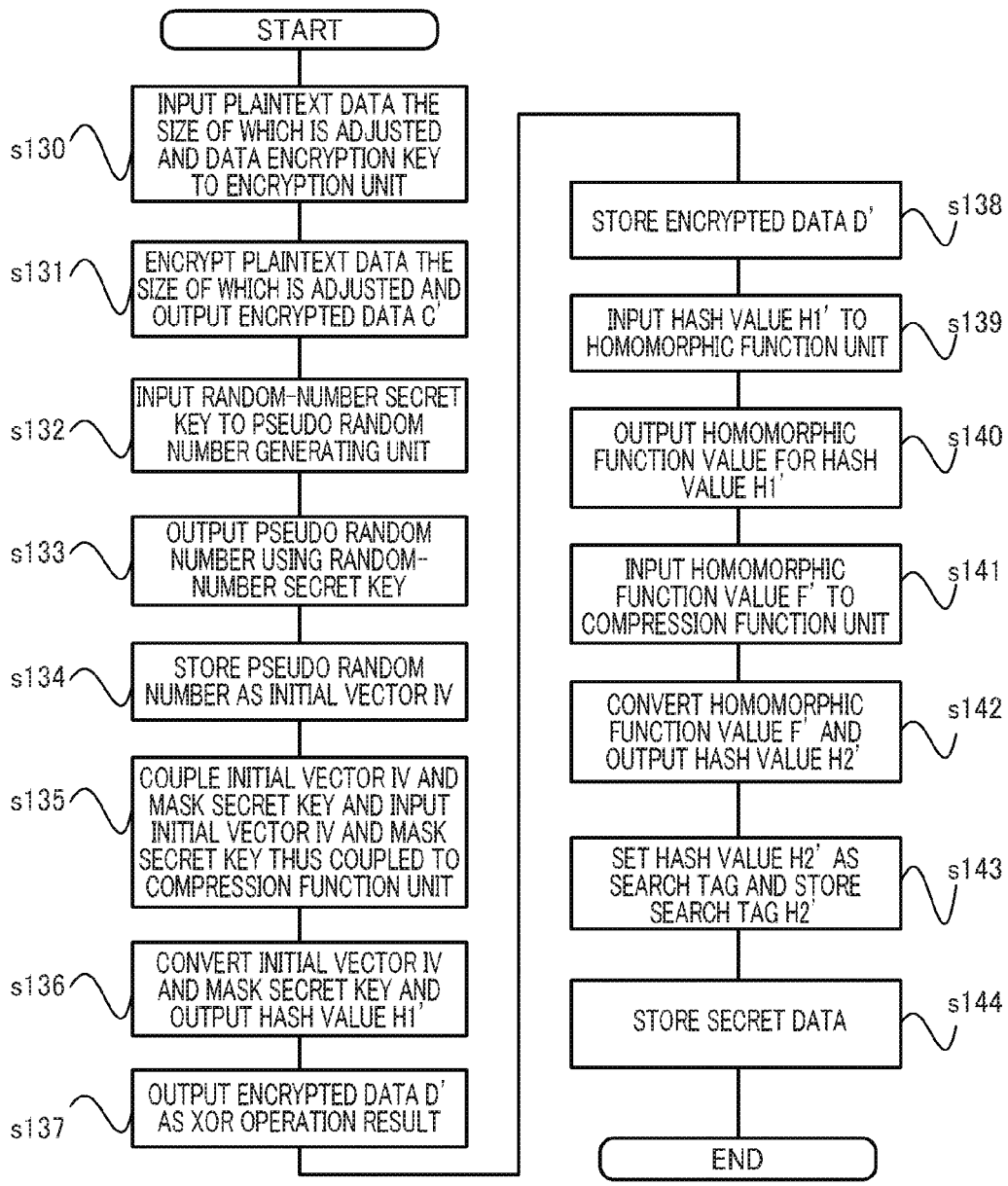
FIG. 14 is a flowchart of exemplary processing procedure 3 of the searchable encryption processing method.

The following describes a method of configuring secret data by the registration client 100. FIG. 13 is a diagram illustrating an overview of the secret data according to the present embodiment. FIG. 14 is a flowchart of exemplary processing procedure 3 of the searchable encryption processing method according to the present embodiment.

In this procedure, the general processing unit 111 of the registration client 100 reads the parameter 160 stored in the storage unit 120, pads the zero value (binary) in the plaintext data 131, adjusts the size of the data, and inputs the plaintext data 131 the size of which is adjusted and the data encryption key 152 read from the storage unit 120 to the encryption unit 112 (s130).

The encryption unit 112 of the registration client 100 encrypts the above-described plaintext data 131 the size of which is adjusted, and outputs encrypted data C' (s131).

The general processing unit 111 of the registration client 100 reads the random-number secret key 151 from the storage unit 120, and inputs the random-number secret key 151 to the pseudo random number generating unit 114 (s132). The pseudo random number generating unit 114 outputs a pseudo random number using the random-number secret key 151 input from the general processing unit 111 (s133). The general processing unit 111 stores this pseudo random number as the initial vector IV in the storage unit 120 (s134).

Subsequently, the general processing unit 111 of the registration client 100 couples the initial vector IV described above and the mask secret key 153, and inputs the initial vector IV described above and the mask secret key 153 thus coupled to the compression function unit 115 (s135). The compression function unit 115 converts the initial vector IV and the mask secret key 153 input from the general processing unit 111, and outputs a hash value H1' (s136). The hash value H1' can be regarded as a random number because of the property of the compression function.

Next, the basic arithmetic operation unit 117 sets the encrypted data C' and the hash value H1' described above as two inputs, and outputs encrypted data D' as a result of the XOR operation of the inputs (s137). The general processing unit 111 stores the encrypted data D' in the storage unit 120 (s138). Expression 7 below is satisfied by the encrypted data C', the hash value H1', and the encrypted data D'.

$$D'=C' \text{ xor } H1' \quad (7)$$

Subsequently, the general processing unit 111 of the registration client 100 inputs the hash value H1' described above to the homomorphic function unit 116 (s139). The homomorphic function unit 116 outputs a homomorphic function value as an output value of data having a homomorphic property for the hash value H1' input from the general processing unit 111 (s140). When func represents the homomorphic function, Expression 8 below is satisfied by the hash value H1' as an input thereto and a homomorphic function value F' as an output therefrom.

$$F'=\text{func}(H1') \quad (8)$$

Then, the general processing unit 111 of the registration client 100 inputs the homomorphic function value F' described above to the compression function unit 115 (s141). The compression function unit 115 converts the homomorphic function value F' and outputs a hash value H2' (s142). The general processing unit 111 sets the hash value H2' as a search tag and stores this search tag H2' in the storage unit 120 (s143).

Subsequently, the general processing unit 111 of the registration client 100 sets secret data to be data obtained by coupling the initial vector IV, the encrypted data D', and the search tag H2', which are acquired through the above-described processing, and stores the secret data in the storage unit 120 (s144). The above-described processing procedure may be executed in a different order. The padding may be performed by another padding method in place of the writing of the zero value. For example, another constant or a random number may be added.

Figure 15:
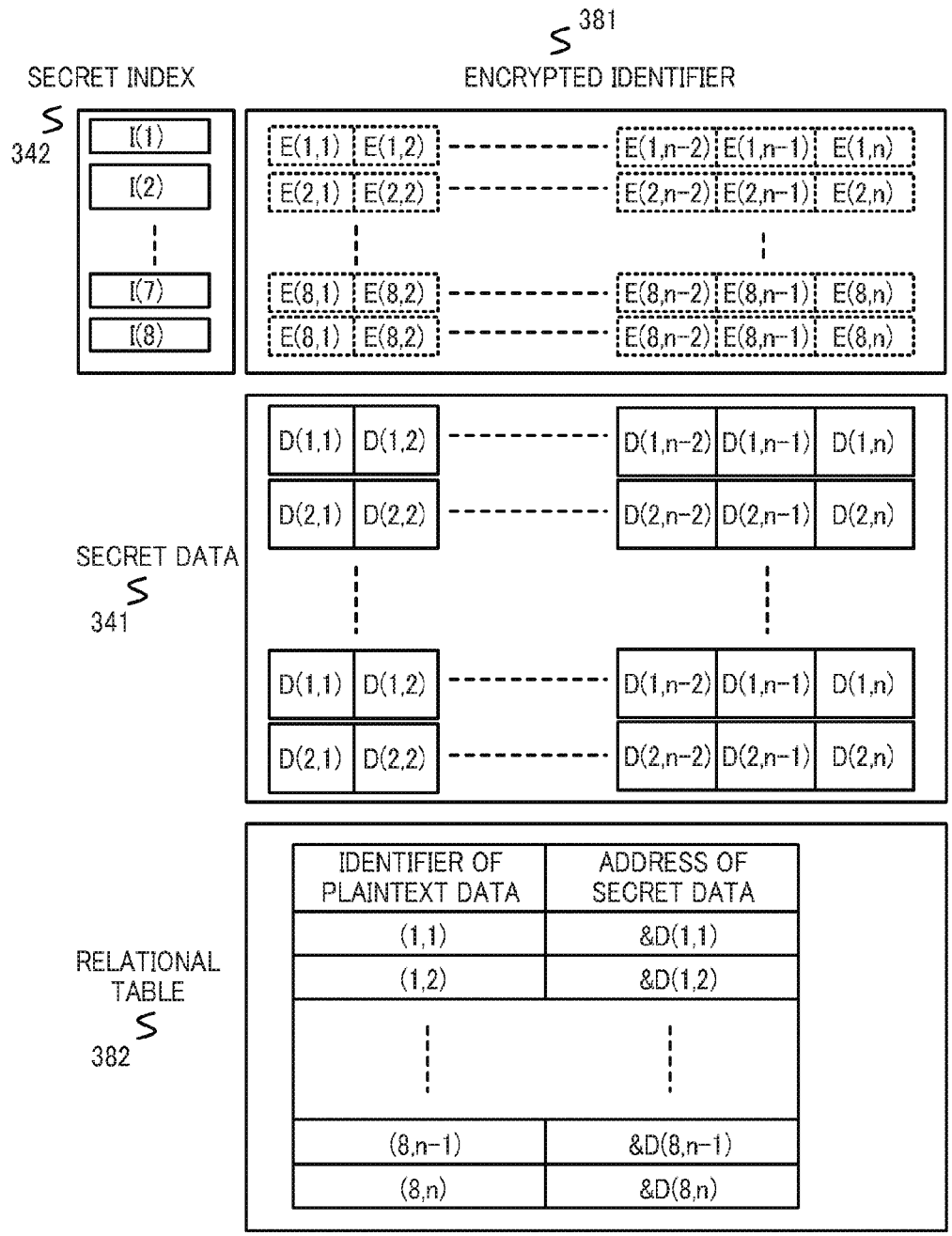
FIG. 15 is a diagram illustrating examples of the secret index, the encrypted identifier, the secret data, and the encrypted identifier stored in a storage unit of a management server.

The following describes an arrangement of various pieces of data acquired by the management server 300 through the above-described processing in a storage region of the storage unit 320. FIG. 15 illustrates the relational table 382 of the secret index 342, the encrypted identifier 381, the secret data 341, the identifier of plaintext data, and the address of the secret data 341, which are stored in the storage unit 320 of the management server 300. The management server 300 stores the secret index 342 such as "I(1)" acquired from the registration client 100 in association with the encrypted identifiers 381 (related to plaintext classified by the corresponding plaintext index) such as "E(1, 1)" to "E(1, n)", as described above.

The encrypted identifiers 381 such as "E(1, 1)" to "E(1, n)" are each stored in association with the secret data 341 such as the corresponding one of "D(1, 1)" to "D(1, n)" obtained by encrypting plaintext classified by the corresponding plaintext index.

In the relational table 382, "E(1, 1)" to "E(1, n)" before being encrypted, which are the identifiers of "(1, 1)" to "(1, n)" of plaintext data, are associated with the addresses of "(1, 1)" to "(1, n)" at which the pieces "D(1, 1)" to "D(1, n)" of the secret data 341 originated from the respective pieces of the plaintext data are stored. Thus, after storing the secret data 341 in the storage unit 320, the management server 300 writes the address of the secret data 341 in the same row as the identifier 138 of plaintext data paired with the secret data 341 in the relational table 382.

Figure 16:
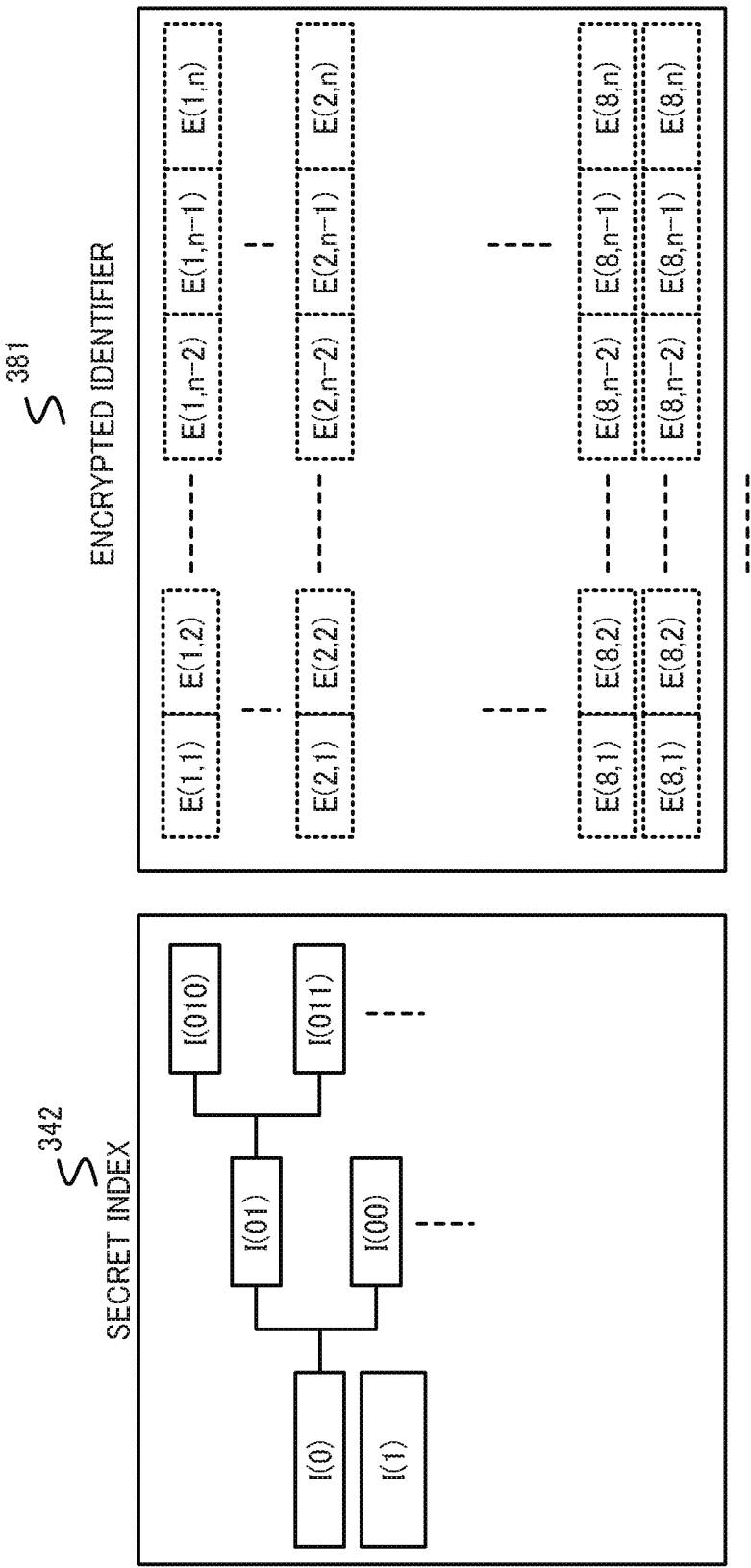
FIG. 16 is a diagram illustrating an exemplary relation between the secret index and the encrypted identifier stored in the storage unit of the management server.

FIG. 16 illustrates a relation in which the hierarchized secret indices 342 are associated with the encrypted identifiers 381. In this case, among the secret indices 342, for example, "I(0)" corresponding to the first bit (for example, the leftmost "0" of "000" in binary notation) of the hash value of plaintext data is set to be at the highest level; "I(01)" and "I(00)" corresponding to the second bits (for example, "1" at the middle of "010" and "0" at the middle of "000" in binary notation) of the hash value of plaintext data are set to be the middle level; and "I(010)" and "I(011)" corresponding to the lowest bit (for example, "010" and "011" in binary notation) of the hash value of plaintext data are set to be the lowest level. In other words, a plurality of levels is formed depending on subordination in classification concepts of plaintext data.

"I(010)", which is the secret index 342 at the lowest level, acquired from the registration client 100 is stored in association with the encrypted identifiers 381 (related to plaintext classified by the corresponding plaintext index) such as "E(1, 1)" to "E(1, n)". Similarly, "I(011)", which is the secret index 342 at the lowest level, is stored in association with the encrypted identifiers 381 such as "E(2, 1)" to "E(2, n)".

The secret index 342 of "I(01)" at the middle level is stored in association with the encrypted identifiers 381 of "E(1, 1)" to "E(1, n)" and "E(2, 1)" to "E(2, n)" described above.

Thus, when the secret indices are hierarchized in this manner, the management server 300 can perform a search for a secret index matching a secret index query by searching secret indices at the highest level among the levels for the secret index 342 having a match at the first bit of the hash value of plaintext data in the storage unit 320 to specify the matching secret index 342, searching secret indices at the middle level under the specified secret index 342 at the highest level for the secret index 342 having a match at the first and second bits of the hash value of plaintext data to specify the matching secret index 342, searching secret indices at the lowest level under the specified secret index 342 at the middle level for the secret index 342 having a match at all bits of the hash value of plaintext data to specify the matching secret index 342, searching a secret data group classified by the matching secret index 342 for secret data matching a secret data query, and returning this searched secret data to the search client 200. Thus, a round-robin search does not need to be executed for a data group as a search target, thereby achieving a faster search.

Figure 17:
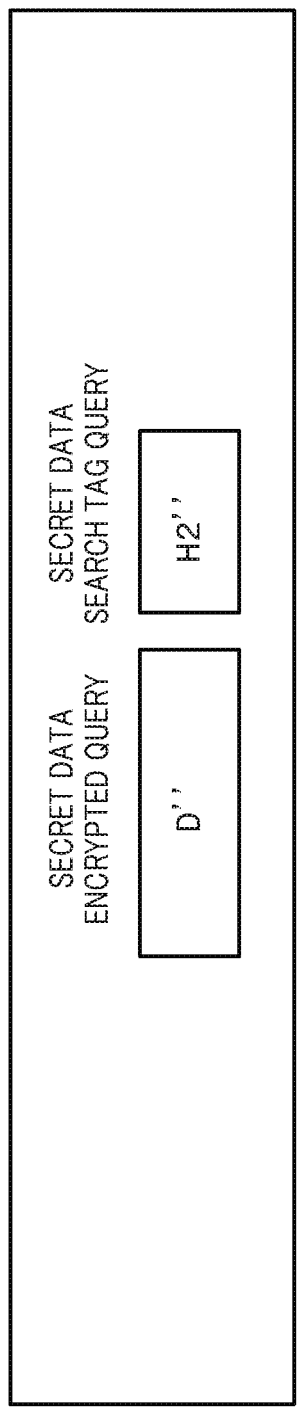
FIG. 17 is a diagram illustrating an example of an overview of a secret data query.
Figure 18:
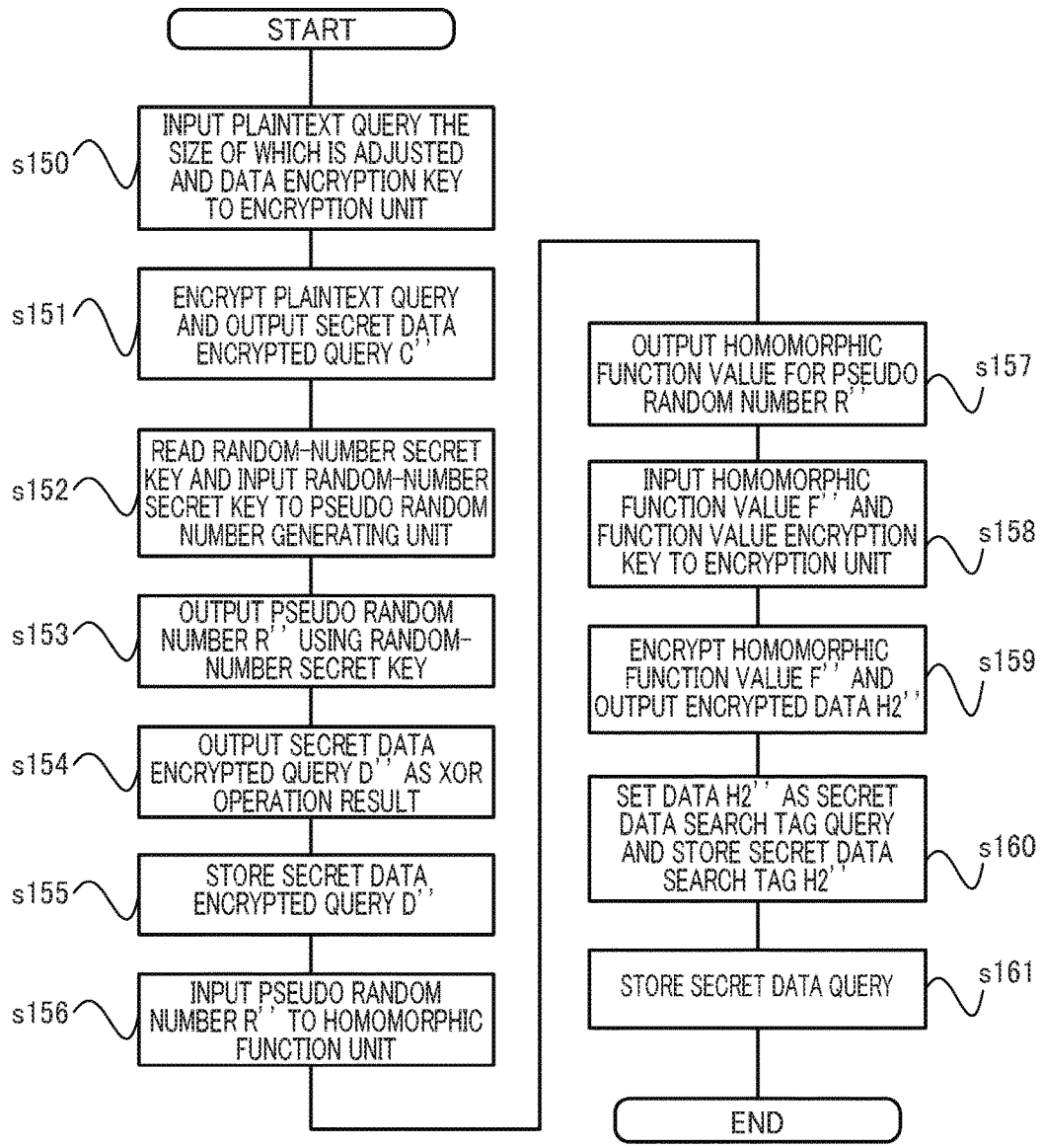
FIG. 18 is a flowchart of exemplary processing procedure 4 of the searchable encryption processing method.

The following describes a method of configuring a secret data query at the search client 200. FIG. 17 is a diagram illustrating an overview of the secret data query according to the present embodiment. FIG. 18 is a flowchart of exemplary processing procedure 4 of the searchable encryption processing method according to the present embodiment.

In this procedure, the general processing unit 211 of the search client 200 reads the parameter 260 stored in the storage unit 220, pads the zero value (binary) in the plaintext query 241, adjusts the size of the data, and inputs the plaintext query 241 and the data encryption key 252 read from the storage unit 220 to the encryption unit 212 (s150).

Next, the encryption unit 212 of the search client 200 encrypts the plaintext query 241 input from the general processing unit 211 described above, and outputs a secret data encrypted query C" (s151).

The general processing unit 211 of the search client 200 reads the random-number secret key 251 from the storage unit 220 and inputs the read random-number secret key 251 to the pseudo random number generating unit 214 (s152). Simultaneously, the pseudo random number generating unit 214 outputs a pseudo random number R" using the random-number secret key 151 input from the general processing unit 211, (s153).

Subsequently, the general processing unit 211 of the search client 200 sets the pseudo random number R" and the secret data encrypted query C" as two inputs, and outputs a secret data encrypted query D" as a result of the XOR operation of the inputs (s154). The general processing unit 211 stores the secret data encrypted query D" in the storage unit 220 (s155). Expression 9 below is satisfied by the secret data encrypted query C", the pseudo random number R", and the secret data encrypted query D".

$$D''=C'' \text{ xor } R'' \qquad (9)$$

Next, the general processing unit 211 of the search client 200 inputs the pseudo random number R" described above to the homomorphic function unit 216 (s156). The homomorphic function unit 216 outputs a homomorphic function value as an output value of data having a homomorphic property for the pseudo random number R" input from the general processing unit 211 (s157). When func represents the homomorphic function, Expression 10 below is satisfied by the pseudo random number R" as an input thereto and a homomorphic function value F" as an output therefrom.

$$F''=\text{func}(R'') \qquad (10)$$

Subsequently, the general processing unit 211 of the search client 200 inputs the homomorphic function value F" described above and the function value encryption key 254 read from the storage unit 220 to the encryption unit 212 (s158). The encryption unit 212 encrypts the homomorphic function value F" and outputs a secret data H2" (s159). The general processing unit 211 sets this data H2" as a secret data search tag query and stores this secret data search tag H2" in the storage unit 220 (s160).

Subsequently, the general processing unit 211 of the search client 200 sets a secret data query to be data obtained by coupling the secret data encrypted query D" and the secret data search tag H2" described above, and stores the secret data query in the storage unit 220 (s161). The above-described processing procedure may be executed in a different order. The padding may be performed by another padding method in place of the writing of the zero value. For example, another constant or a random number may be added.

Figure 19:
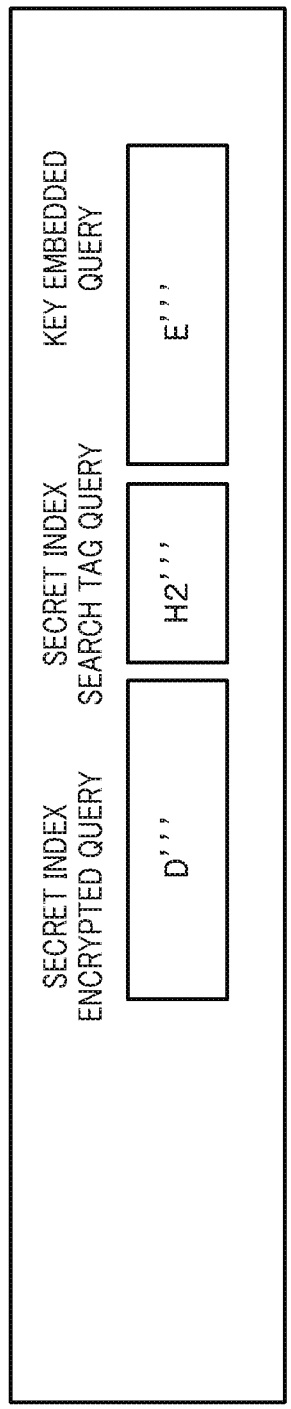
FIG. 19 is a diagram illustrating an overview of a secret index query.
Figure 20:
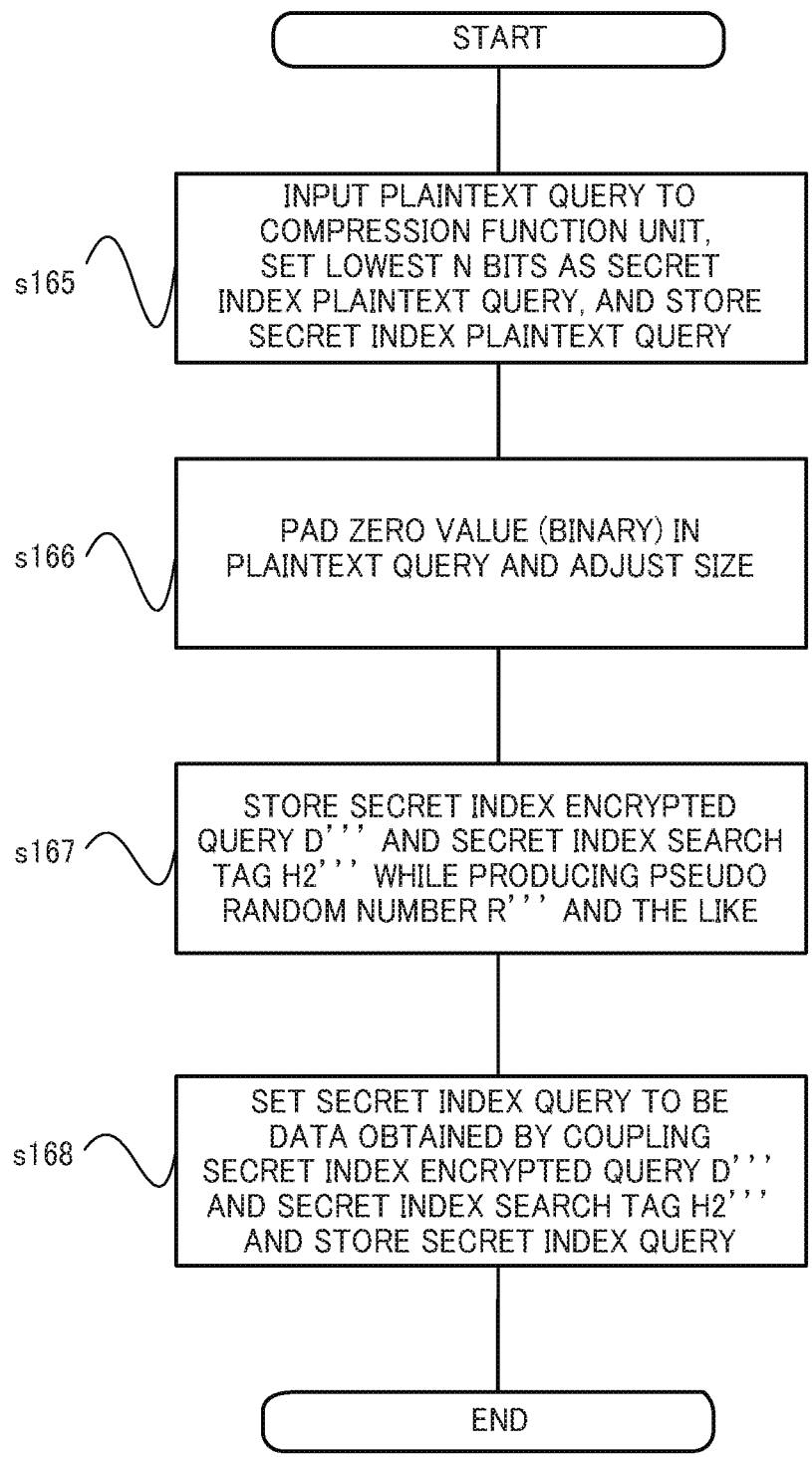
FIG. 20 is a flowchart of exemplary processing procedure 5 of the searchable encryption processing method.

The following describes a method of configuring a secret index query at the search client 200. FIG. 19 is a diagram illustrating an overview of the secret index query according to the present embodiment. FIG. 20 is a flowchart of exemplary processing procedure 5 of the searchable encryption processing method according to the present embodiment.

In this procedure, the general processing unit 211 of the search client 200 inputs the plaintext query 241 to the compression function unit 215, sets the lowest n bits (for example, three bits) of the output query as a secret index plaintext query, and stores the secret index plaintext query in the storage unit 220 (s165). The general processing unit 211 pads the zero value (binary) in the plaintext query 241, and adjusts the size of the data (s166). The following procedure is the same as the procedure of configuring a secret data query. Specifically, the general processing unit 211 of the search client 200 stores a secret index encrypted query D'" and a secret index search tag H2'" in the storage unit 220 while producing the pseudo random number R'" and the like (s167).

The general processing unit 211 of the search client 200 sets a secret index query to be data obtained by coupling the secret index encrypted query D'" and the secret index search tag H2'", and stores the secret index query in the storage unit 220 (s168). The padding may be performed by another padding method in place of the writing of the zero value. For example, another constant or a random number may be added.

Figure 21:
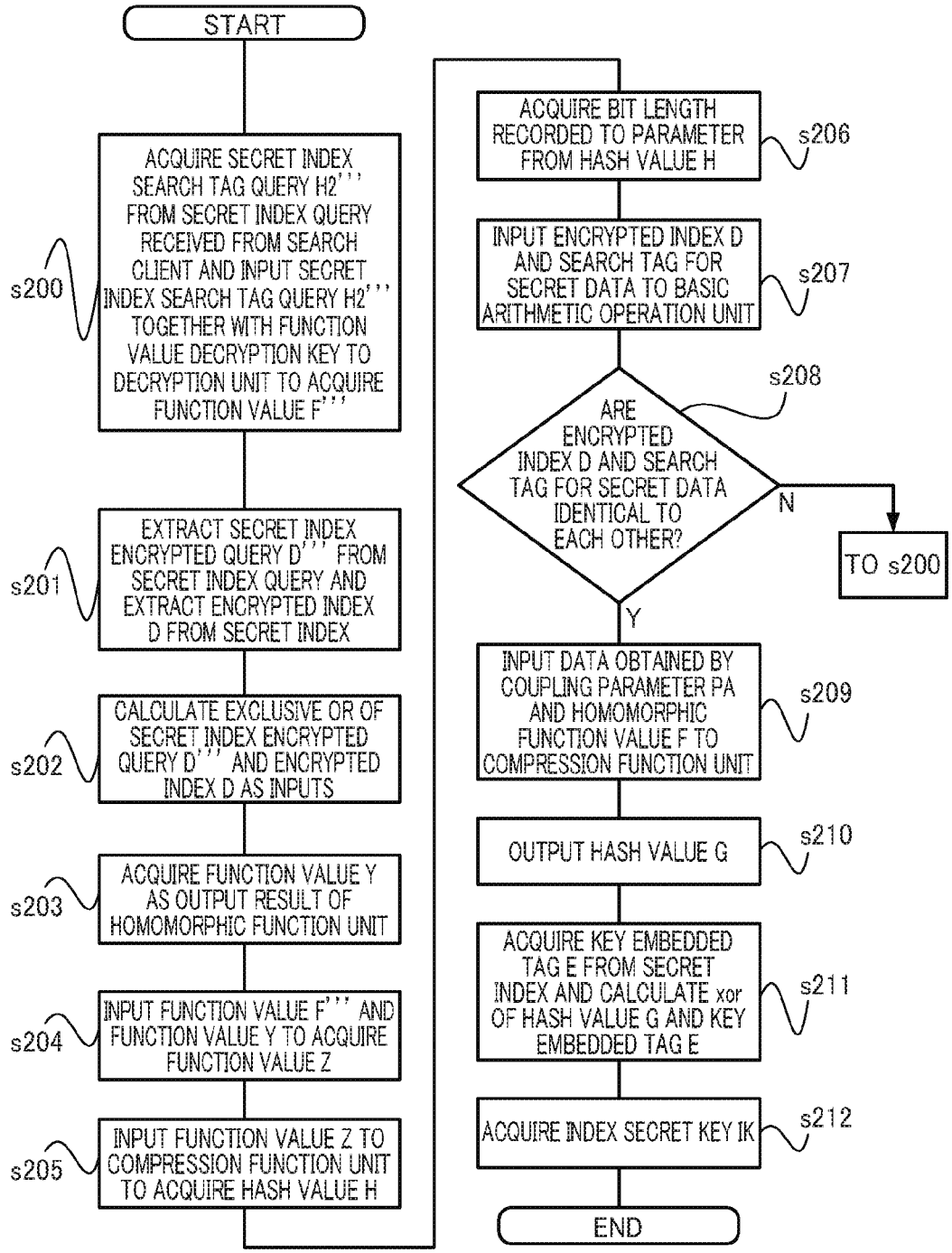
FIG. 21 is a flowchart of exemplary processing procedure 6 of the searchable encryption processing method.

The following describes a method of searching a secret index matching a secret index query. FIG. 21 is a flowchart of exemplary processing procedure 6 of the searchable encryption processing method according to the present embodiment. The flowchart illustrates the procedure of searching for a secret index using a secret index query at the management server 300. The management server 300 detects whether plaintext data and the data value of a plaintext query are identical to each other using the secret data 341, the secret data query, the secret index 342, and the secret index query, and searches for any matching secret data 341 if they are identical to each other.

In this procedure, the general processing unit 311 of the management server 300 acquires the secret index search tag H2'" from a secret index query received from the search client 200, and inputs the secret index search tag query H2''' together with the function value decryption key 354 to the decryption unit 313 to acquire an output function value F''' (s200). The function value F''' is obtained by Expression 11 below using the random number R''' and the homomorphic function func.

$$F''' = \text{func}(R''') \tag{11}$$

Next, the general processing unit 311 of the management server 300 extracts the secret index encrypted query D''' from the secret index query described above, and further extracts the encrypted index D from the secret index 342 in the storage unit 320 (s201).

Subsequently, the basic arithmetic operation unit 317 of the management server 300 calculates the exclusive OR (XOR) of the secret index encrypted query D''' and the encrypted index D described above as inputs to acquire an output result by Expression 12 below (s202).

$$D \text{ xor } D''' = (C \text{ xor } R)\text{xor}(C'''\text{xor } R''') \tag{12}$$

If the plaintext index and the data value of the plaintext query are identical to each other, the values of data obtained by encrypting the index and the value are identical to each other, which derives Expression 13 below.

$$D \text{ xor } D''' = R \text{ xor } R''' \tag{13}$$

Thus, only information of the random number (R xor R''') remains. Then, the general processing unit 311 of the management server 300 inputs the output result of the basic arithmetic operation unit 317 described above to the homomorphic function unit 316 to acquire a function value Y as an output result of the homomorphic function unit 316 (s203). The function value Y satisfies Expression 14 below.

$$Y = \text{func}(D \text{ xor } D''') \tag{14}$$

Subsequently, the general processing unit 311 of the management server 300 inputs the function value F''' and the function value Y described above to the basic arithmetic operation unit 317 to acquire a function value Z as the exclusive OR (XOR) of the inputs calculated by the basic arithmetic operation unit 317 (s204). When the plaintext index and the data value of the plaintext query are identical to each other, in other words, when Expression 13 described above is satisfied, the function value Z satisfies Expression 15 below.

$$\begin{aligned} Z &= F''' \text{xor } Y \\ &= \text{func}(R''')\text{xor } \text{func}(D \text{ xor } D''') \\ &= \text{func}(R''')\text{xor } \text{func}(R \text{ xor } R''') \\ &= \text{func}(Rn)\text{xor } \text{func}(R)\text{xor } \text{func}(R''') \\ &= \text{func}(R''') \end{aligned} \tag{15}$$

Next, the general processing unit 311 of the management server 300 inputs the function value Z described above to the compression function unit 315 to acquire data output from the compression function unit 315 as a hash value H (s205).

The general processing unit 311 of the management server 300 acquires a bit length recorded to a parameter from the hash value H described above, and sets the acquired bit length as a search tag (s206). For example, as illustrated in FIG. 10, the lowest three bits are extracted.

Subsequently, the general processing unit 311 of the management server 300 inputs the encrypted index D and the search tag for secret data described above to the basic arithmetic operation unit 317 (s207). The basic arithmetic operation unit 317 performs a comparison of the encrypted index D and the search tag for secret data described above (s208), and performs processing of step s209 described below if the secret index D and the search tag for secret data are identical to each other (Y at s208). If the secret index D and the search tag for secret data are different from each other (N at s208), the basic arithmetic operation unit 317 stops the process and returns the process to step s200 described above to perform another search of a secret index and a secret index query.

The general processing unit 311 of the management server 300 calls the parameter PA from the storage unit 320, and inputs data obtained by coupling the parameter PA and the homomorphic function value F to the compression function unit 315 (s209). The compression function unit 315 converts the homomorphic function value F and the parameter PA thus coupled, and outputs a hash value G (s210). When hash represents the compression function, Expression 16 below is satisfied by the parameter PA, the homomorphic function value F, and the output hash value G.

$$G = \text{hash}(F\|PA) \tag{16}$$

Subsequently, the general processing unit 311 of the management server 300 acquires the key embedded tag E from the secret index 342, and causes the basic arithmetic operation unit 317 to calculate the xor of the hash value G and the key embedded tag E (s211). According to Expression 17 below, this output data corresponds to the index secret key IK, and Expression 17 below is satisfied by the hash value H3 and the key embedded tag E.

$$\begin{aligned} E \text{ xor } G &= \text{hash}(F\|PA)\text{xor}(IK \text{ xor } H3) \\ &= \text{hash}(F\|PA)\text{xor}(IK \text{ xor } \text{hash}(F\|PA)) \\ &= \text{hash}(F\|PA)\text{xor } IK \text{ xor } \text{hash}(F\|PA) \\ &= IK \end{aligned} \tag{17}$$

Thus, if the plaintext index and the data value of the plaintext query are identical to each other, the general processing unit 311 of the management server 300 can acquire the index secret key IK (s212). The above-described processing procedure may be executed in a different order. When secret indices are hierarchized as illustrated in FIG. 16, the processing at step s208 described above first extracts the first bit of a search tag, determines whether the extracted bit is identical to any encrypted index in the highest level, determines whether two bits of the first and second bits of the search tag are identical to any encrypted index in the second level subordinate to an encrypted index specified by this determination, determines whether the three bits of the search tag are identical encrypted indices in the lowest level subordinate to an encrypted index specified by this determination, and sets a result of this determination as a result of this step s208. In this procedure, the return of the process to step S200 as a result of an "N" determination at this step s208 corresponds to a case in which the matching determination is not obtained at any one of the determinations in the highest level to the lowest level, in other words, no encrypted index matches bits. This processing using a hierarchized index structure can be similarly executed in the following search processing.

Figure 22:
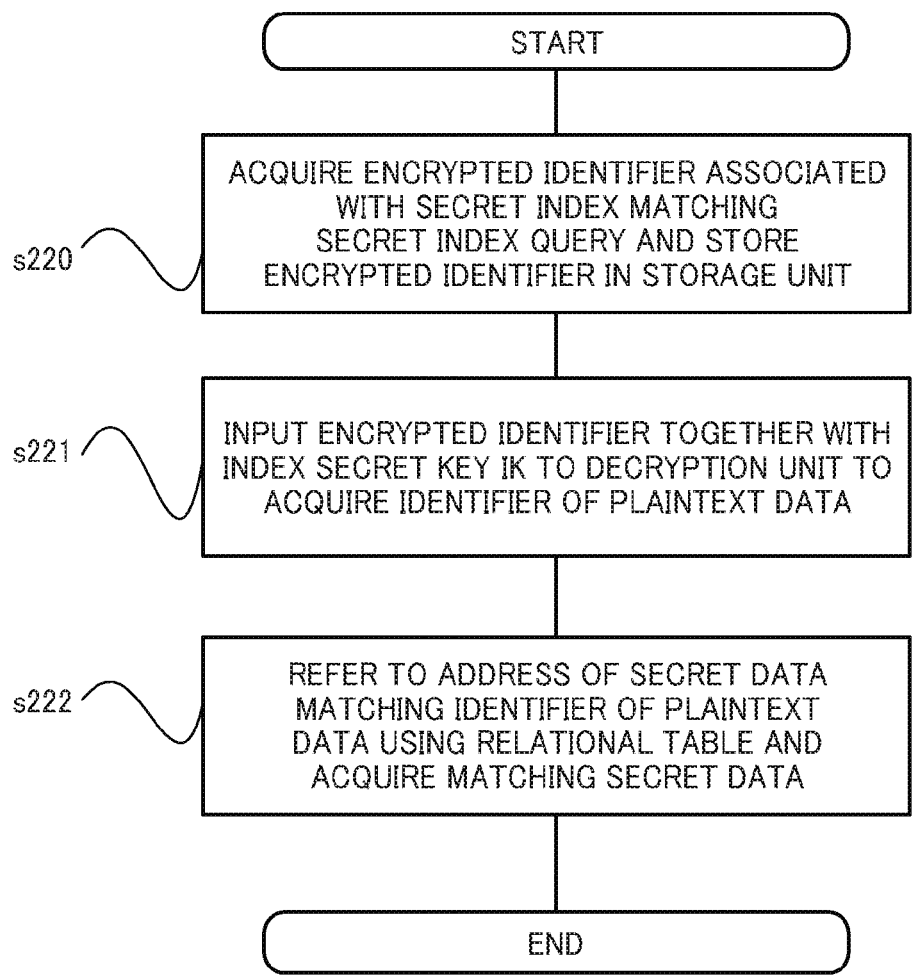
FIG. 22 is a flowchart of exemplary processing procedure 7 of the searchable encryption processing method.

The following describes a method of searching for secret data matching a secret index. FIG. 22 is a flowchart of exemplary processing procedure 7 of the searchable encryption processing method according to the present embodiment. In this procedure, the general processing unit 311 of the management server 300 acquires the encrypted identifier 381 associated with a secret index matching a secret index query, and stores the encrypted identifier 381 in the storage unit 320 (s220). In the example illustrated in FIG. 15, when I(1) matches a secret index query, the encrypted identifiers of E(1, 1), E(1, 2), . . . , E(1, n) associated with I(1) are acquired.

Subsequently, the general processing unit 311 of the management server 300 acquires the encrypted identifier 381 stored in the storage unit 320, and inputs the encrypted identifier 381 together with the index secret key IK to the decryption unit 313 to acquire the identifier of plaintext data (s221).

Subsequently, the general processing unit 311 of the management server 300 refers to the address of the secret data 341 matching the identifier of plaintext data using the relational table 382, and acquires the matching secret data 341 (s222). For example, in the example illustrated in FIG. 15, when the identifier (1, 1) of plaintext data is matched, the secret data D(1, 1) is acquired at the address &D(1, 1) of secret data on the same row of the relational table 382.

Figure 23:
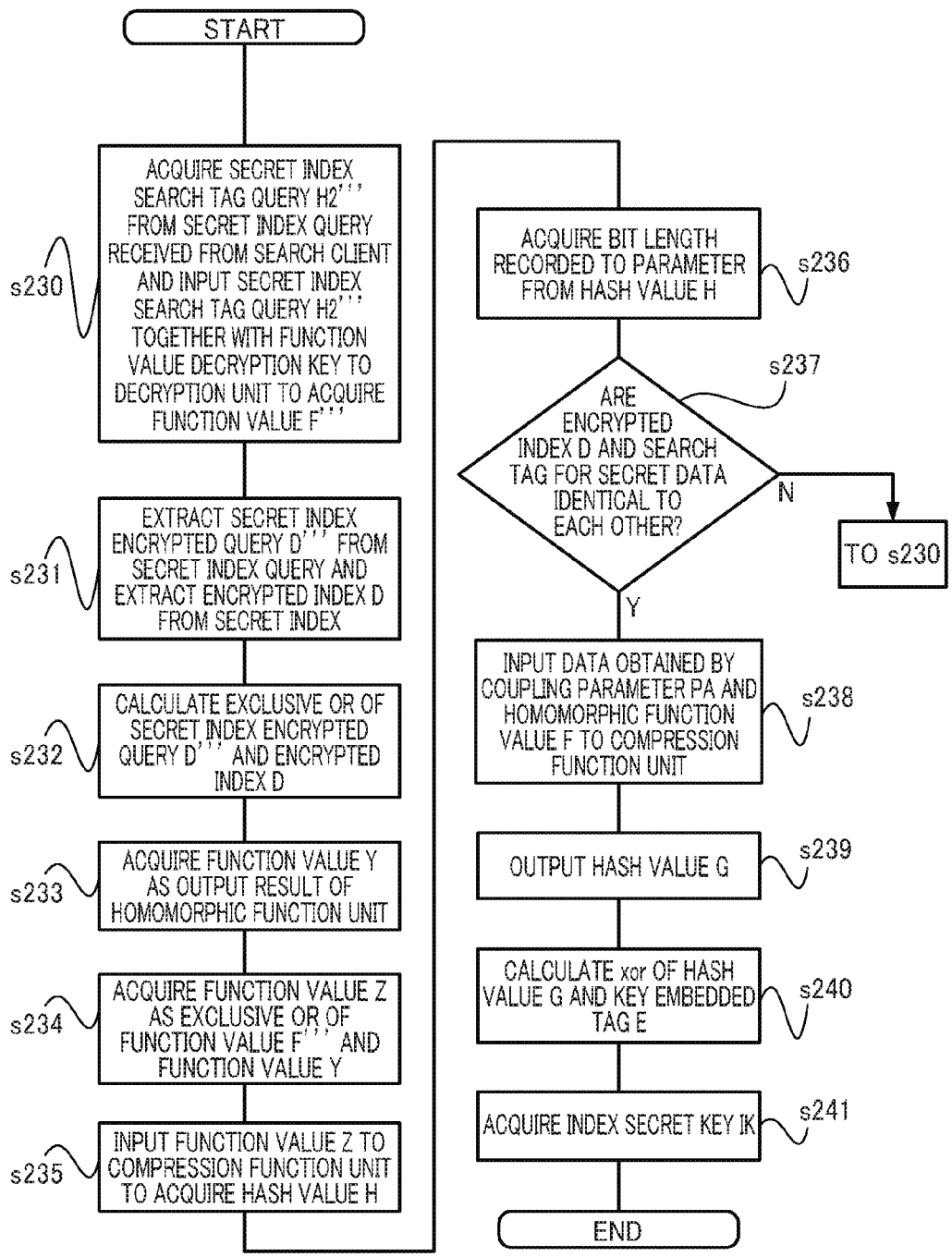
FIG. 23 is a flowchart of exemplary processing procedure 8 of the searchable encryption processing method.

The following describes a search method using secret data at the management server 300. FIG. 23 is a flowchart of exemplary processing procedure 8 of the searchable encryption processing method according to the present embodiment. The flowchart illustrates the procedure of searching for secret data using secret data and a secret index at the management server 300. The management server 300 detects whether plaintext data and the data value of a plaintext query are identical to each other using the secret data 341, a secret data query, the secret index 342, and a secret index query. Then, the management server 300 searches for any matching secret data if the plaintext data and the data value of the plaintext query are identical to each other.

In this example, the general processing unit 311 of the management server 300 acquires the secret index search tag query H2''' from a secret index query received from the search client 200, and inputs the secret index search tag query H2''' together with the function value decryption key 354 to the decryption unit 313 to acquire the output function value F''' (s230). The function value F''' is obtained by Expression 18 below using the random number R''' and the homomorphic function func.

$$F''' = \text{func}(R''') \quad (18)$$

Next, the general processing unit 311 of the management server 300 extracts the secret index encrypted query D''' from the secret index query, and further extracts the secret index D from the secret index (s231). The basic arithmetic operation unit 317 of the management server 300 calculates the exclusive OR (XOR) of the secret index encrypted query D''' and the secret index D as inputs to acquire an output result by Expression 19 below (s232).

$$D \text{ xor } D''' = (C \text{ xor } R) \text{xor}(C''' \text{ xor } R''') \quad (19)$$

When the plaintext index and the data value of the plaintext query are identical to each other, the values of data obtained by encryption are identical to each other, which derives Expression 20 below.

$$D \text{ xor } D''' = R \text{ xor } R''' \quad (20)$$

Thus, only information of the random number (R xor R'') remains.

Subsequently, the general processing unit 311 of the management server 300 inputs the output result of the basic arithmetic operation unit 317 to the homomorphic function unit 316 to acquire the function value Y as an output result of the homomorphic function unit 316 (s233). The function value Y satisfies Expression 21 below.

$$Y = \text{func}(D \text{ xor } D'') \quad (21)$$

Subsequently, the general processing unit 311 of the management server 300 inputs the function value F''' and the function value Y to the basic arithmetic operation unit 317 to acquire the function value Z as the exclusive OR (XOR) of the inputs calculated by the basic arithmetic operation unit 317 (s234). When the plaintext index and the data value of the plaintext query are identical to each other, in other words, when Expression 20 described above is satisfied, the function value Z satisfies Expression 22 below.

$$\begin{aligned} Z &= F''' \text{xor } Y \\ &= \text{func}(R''') \text{xor } (\text{func}(D \text{ xor } D'')) \\ &= \text{func}(R''') \text{xor } (\text{func}(R \text{ xor } R''')) \\ &= \text{func}(Rn) \text{xor func}(R) \text{xor func}(R''') \\ &= \text{func}(R''') \end{aligned} \quad (22)$$

Next, the general processing unit 311 of the management server 300 inputs the function value Z to the compression function unit 315 to acquire output data as the hash value H (s235). The general processing unit 311 of the management server 300 acquires a bit length recorded to a parameter from the hash value H described above, and sets the acquired bit length as a search tag (s236). For example, as illustrated in FIG. 10, the lowest three bits are extracted.

The general processing unit 311 of the management server 300 inputs the secret index D and the search tag for secret data to the basic arithmetic operation unit 317 to perform a comparison of the inputs (s237). If the comparison at the basic arithmetic operation unit 317 finds that the secret index D and the search tag for secret data are identical to each other (Y at s237), the general processing unit 311 executes step s238. If the comparison finds that the secret index D and the search tag for secret data are different from each other (N at s237), the general processing unit 311 stops the process and returns the process to step s230 to perform another search of a secret index and a secret index query.

The general processing unit 311 of the management server 300 calls the parameter PA from the storage unit 320, and inputs data obtained by coupling the parameter PA and the homomorphic function value F to the compression function unit 315 (s238). The compression function unit 315 converts the homomorphic function value F and the parameter PA thus coupled, and outputs the hash value G (s239). When hash represents the compression function, Expression 23 below is satisfied by the parameter PA, the homomorphic function value F, and the output hash value G.

$$G = \text{hash}(F \| PA) \quad (23)$$

Next, the general processing unit 311 acquires the key embedded tag E from the secret index 342, and causes the basic arithmetic operation unit 317 to calculate the xor of the hash value G and the key embedded tag E (s240). According to Expression 24 below, this output data corresponds to the index secret key IK. In this case, Expression 24 below is satisfied by the hash value H3 and the key embedded tag E.

$$E \text{ xor } G = \text{hash}(F\|PA) \text{xor}(IK \text{ xor } H3) \quad (24)$$
$$= \text{hash}(F\|PA) \text{xor}(IK \text{ xor } \text{hash}(F\|PA))$$
$$= \text{hash}(F\|PA) \text{xor } IK \text{ xor } \text{hash}(F\|PA)$$
$$= IK$$

Thus, if the plaintext index and the data value of the plaintext query are identical to each other, the general processing unit 311 of the management server 300 can acquire the index secret key IK (s241). The above-described processing procedure may be executed in a different order.

Figure 24:
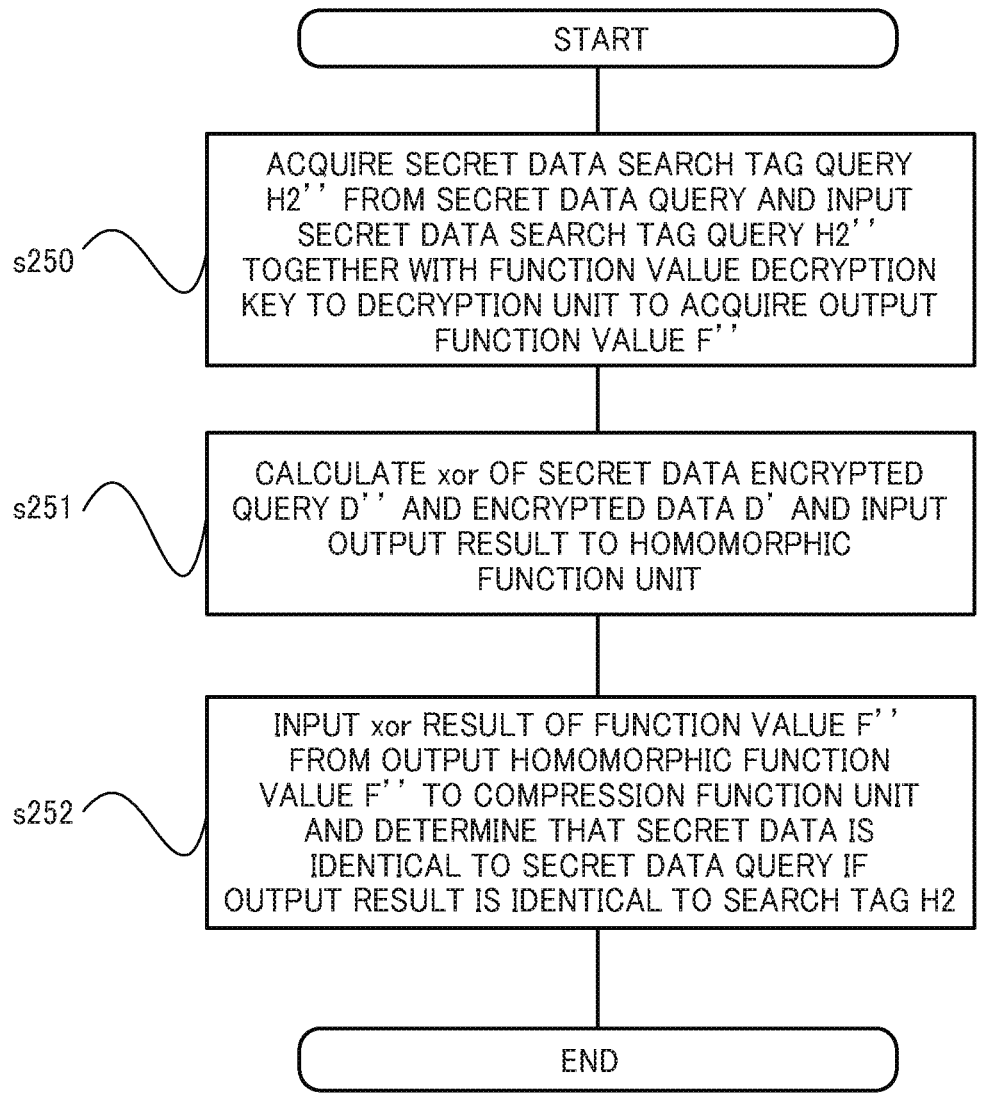
FIG. 24 is a flowchart of exemplary processing procedure 9 of the searchable encryption processing method.

The following describes a method of searching for secret data matching a secret index. FIG. 24 is a flowchart of exemplary processing procedure 9 of the searchable encryption processing method according to the present embodiment. The procedure of searching for secret data using a secret data query at the management server 300 described in this example is the same as the procedure of searching for a secret index using a secret index query. In this procedure, the management server 300 acquires the secret data search tag query H2″ from a secret data query received from the search client 200, and inputs the secret data search tag query H2″ together with a function value decryption key to the decryption unit 313 to acquire the output function value F″ (s250).

The management server 300 calculates the xor of the secret data encrypted query D″ and the encrypted data D′ and inputs this output result to the homomorphic function unit 316 (s251). The management server 300 inputs the xor result of the function value F″ from an output homomorphic function value F″ to the compression function unit 315, and determines that the secret data is identical to the secret data query if this output result is identical to the search tag H2 (s252). The above-described processing procedure may be executed in a different order, similarly to the procedure of searching for a secret index using a secret index query.

Figure 25:
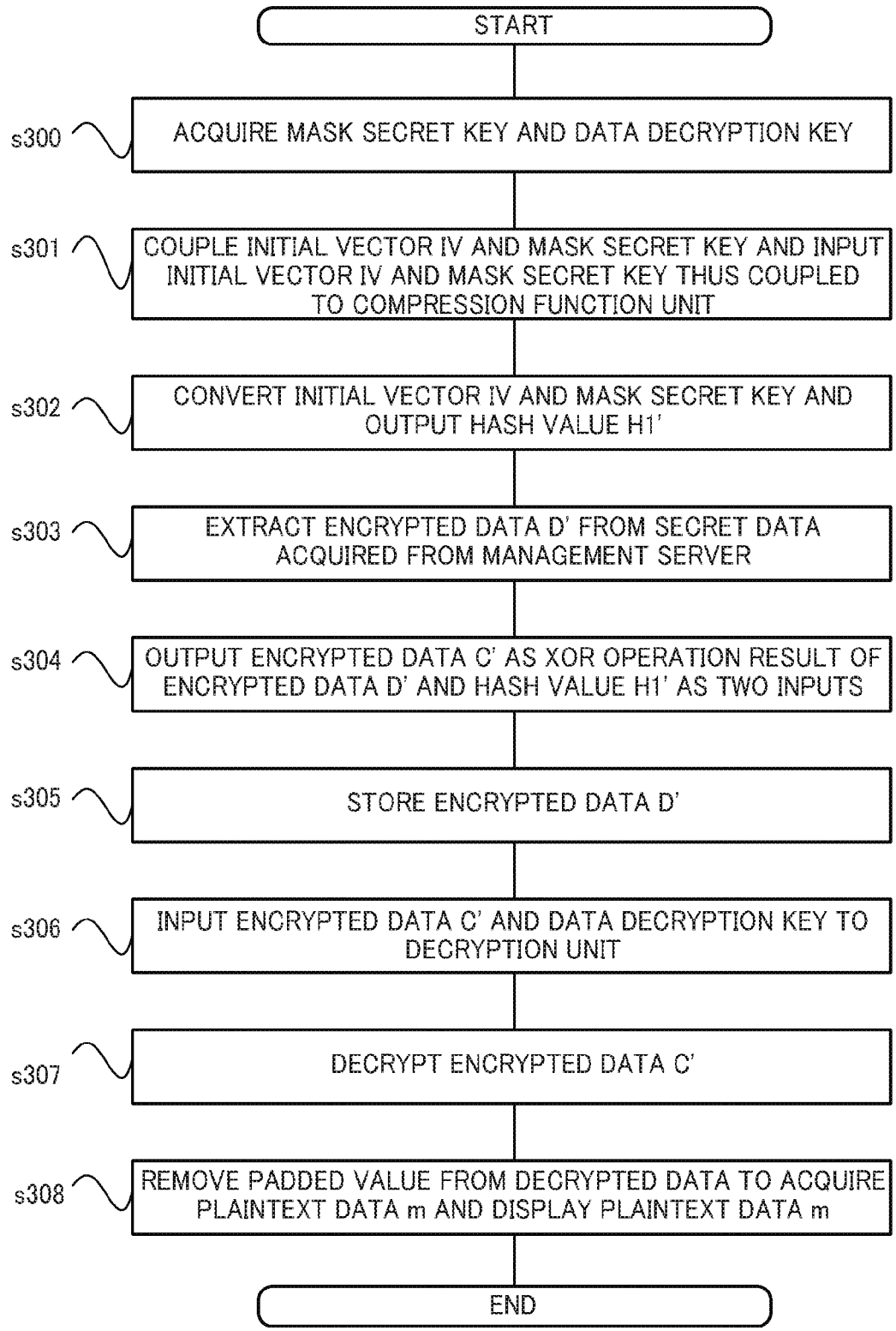
FIG. 25 is a flowchart of exemplary processing procedure 10 of the searchable encryption processing method.

The following describes a method of decrypting secret data. FIG. 25 is a flowchart of exemplary processing procedure 10 of the searchable encryption processing method according to the present embodiment, illustrating the processing procedure of the method of decrypting secret data at the search client 200.

In this procedure, the general processing unit 211 of the search client 200 acquires the mask secret key 253 and the data decryption key 258 from the storage unit 220 (s300).

The general processing unit 211 of the search client 200 couples the initial vector IV included in secret data returned from the management server 300, and the mask secret key 253 acquired at step s300 described above, and inputs the initial vector IV and the mask secret key 253 thus coupled to the compression function unit 215 (s301). Then, the compression function unit 215 converts the initial vector IV and the mask secret key 253 described above, which are input from the general processing unit 211, and outputs the hash value H1′ (s302).

Next, the general processing unit 211 of the search client 200 extracts the encrypted data D′ from the secret data acquired from the management server 300 (s303). The basic arithmetic operation unit 211 outputs the encrypted data C′ as a result of the XOR operation of the encrypted data D′ described above and the hash value H1′ acquired at step s302 described above as two inputs (s304).

Subsequently, the general processing unit 211 stores the encrypted data D′ described above in the storage unit 220 (s305). Expression 25 below is satisfied by the encrypted data D′, the hash value H1′, and the encrypted data C′.

$$C' = D' \text{ xor } H1' \quad (25)$$

The general processing unit 211 inputs the encrypted data C′ and the data decryption key 258 described above to the decryption unit 213 (s306). Then, the decryption unit 213 decrypts the encrypted data C′ described above (s307). The general processing unit 211 reads the parameter 260 stored in the storage unit 220, removes the padded value from the data decrypted at step s307 described above to acquire plaintext data m, and displays the plaintext data m on the output unit 202 (s308).

The best modes for carrying out the present invention are specifically described above, but the present invention is not limited thereto, and various modifications are possible without departing from the scope of the invention.

The present embodiment can achieve speed-up of search processing of large volume data in a system in which a search for encrypted data is performed while a search query is kept encrypted.

The description of the present specification discloses at least the following. Specifically, in the searchable encryption processing system according to the present embodiment, the storage device of the server further stores, in association with the secret index, an encrypted identifier obtained by encrypting an identifier indicating the plaintext data classified by the secret index, and further stores a relational table indicating a correspondence relation between the identifier indicating plaintext data and the address of secret data originated from the matching plaintext data. The arithmetic device of the server executes a process including acquiring an encrypted identifier corresponding to the matching secret index thus searched from the storage device, decrypting the acquired encrypted identifier with a predetermined key to acquire the identifier of plaintext data, checking the identifier of plaintext data against the relational table, and specifying an address of secret data corresponding to the identifier of plaintext data to acquire the secret data.

With this configuration, when the server performs a search for secret data in the storage device, the storage location, in other words, the address of the secret data is easily specified, and the secret data can be efficiently acquired based on the address. Accordingly, the overall search efficiency is improved.

In the searchable encryption processing system according to the present embodiment, the number of the encrypted identifiers associated with each secret index may be same between secret indices in the storage device of the server.

With this configuration, the number of pieces of secret data has no difference between secret indices, which reduces the risk of such a guess that, for example, a larger number of pieces of secret data as a search processing target, in other words, useful information is stored in a secret index having a high frequency. Accordingly, improved security of the search processing is achieved.

In the searchable encryption processing system according to the present embodiment, the arithmetic device of the server may extract secret key information from the secret index query received from the search client and decode the encrypted identifier based on the secret key information. With this configuration, an encrypted identifier can be securely and efficiently decrypted.

In the searchable encryption processing system according to the present embodiment, the secret index may be included in a plurality of levels depending on subordination in classification concepts of the plaintext data in the storage device of the server, and the arithmetic device of the server may sequentially execute a search on the secret indices along a subordination sequence form the highest level to the lowest level among the plurality of levels to find a secret index matching the secret index query, search a secret data group classified by a secret index in the lowest level specified by this search to find secret data matching the secret data query, and return the searched secret data to the search client.

With this configuration, the processing of removing secret data not belonging to a classification of secret indices, in other words, not being a search target from the search processing is sequentially performed in the above order of the levels, further improving the efficiency of the search processing to achieve a further reduction in a time taken for a search.

The searchable encryption processing system according to the present embodiment may further include a registration client including a communication device configured to communicate with another device, and an arithmetic device configured to execute a process including concealing plaintext data to generate secret data, concealing a plaintext index for classifying the plaintext data to generate a secret index, and transmitting the secret data and the secret index as the search target data to the server.

With this configuration, secret data and secret indices stored in the storage device of the server can be further efficiently acquired and managed.

In the searchable encryption processing system according to the present embodiment, the arithmetic device of the registration client may apply a predetermined algorithm to the plaintext data to generate the plaintext index.

With this configuration, a secret index stored in the storage device of the server can be efficiently generated from a plaintext index based on plaintext data and registered at the registration client.

In the searchable encryption processing system according to the present embodiment, the arithmetic device of the registration client may apply a hash function or n-gram to the plaintext data to generate the plaintext index.

With this configuration, a secret index stored in the storage device of the server can be further efficiently and securely generated from a plaintext index based on plaintext data and registered at the registration client.

In the searchable encryption processing system according to the present embodiment, the arithmetic device of the registration client may encrypt an identifier indicating the plaintext data to generate an encrypted identifier, and transmit the encrypted identifier to the server.

With this configuration, the address of secret data can be efficiently specified at the server storing an encrypted identifier described above based on the encrypted identifier and the relational table at a search, thereby improving the overall search efficiency.

In the searchable encryption processing system according to the present embodiment, the arithmetic device of the registration client may generate the same number of the encrypted identifiers for each secret index.

With this configuration, the number of pieces of secret data has no difference between secret indices, which reduces the risk of such a guess that, for example, a larger number of pieces of secret data as a search processing target, in other words, useful information is stored in a secret index having a high frequency. Accordingly, improved security of the search processing is achieved.

In the searchable encryption processing system according to the present embodiment, the arithmetic device of the registration client may configure the secret indices at a plurality of levels depending on the subordination in classification concepts of the plaintext data, and transmit the secret indices at the levels and the secret data as the search target data to the server.

With this configuration, the server described above can perform the processing of removing secret data not belonging to a classification of secret indices, in other words, not being a search target from the search processing, sequentially along the aforementioned subordination sequence of the levels, further improving the efficiency of the search processing to achieve a further reduction in a time taken for a search.

The invention claimed is:

1. A searchable encryption processing system that improves data security, the system comprising:
   a server that stores in a memory:
      encrypted data,
      an encrypted index,
      an encrypted identifier in association with the encrypted index, wherein the encrypted identifier is obtained by encrypting an identifier indicating plaintext data classified by the encrypted index, and
      a relational table indicating a correspondence relation between the encryption identifier and an address of encrypted data originated from the plaintext data; and
   a search client computer that is communicatively coupled to the server via a network;
   wherein the search client computer:
      encrypts a plaintext query to form an encrypted data query,
      encrypts a plaintext index to form an encrypted index query,
      transmits, to the server, the encrypted data query and the encrypted index query,
      receives, from the server, matched encrypted data in response to the encrypted data query and the encrypted index query,
      acquires, from the server, the encrypted identifier associated with a matching encrypted index searched,
      decrypts the encrypted identifier associated with the matching encrypted index searched by applying a predetermined key to acquire an identifier of plaintext data,
      checks the identifier of the plaintext data against the relational table,
      identifies the address of encrypted data corresponding to the identifier of the plaintext data to acquire the encrypted data, and
      forms returned plaintext data by decrypting the matched encrypted data received from the server; and
   wherein the server determines the matched encrypted data by:
      searching the memory for the matching encrypted index that matches the encrypted index query using a bitwise operator, and
      searching an encrypted data group classified by the matching encrypted index for encrypted data matching the encrypted data query using the bitwise operator.

2. The searchable encryption processing system according to claim 1, wherein in the server, encrypted indices are associated with a same number of the encrypted identifiers.

3. The searchable encryption processing system according to claim 2, wherein the search client computer further:

extracts secret key information from the encrypted index query received from the search client and decrypts the encrypted identifier by using the secret key information.

4. The searchable encryption processing system according to claim 3, wherein:
in the server, the encrypted indices are stored in a plurality of levels depending on subordination in classification concepts of the plaintext data, and
the search client computer sequentially executes a search in the encrypted indices along a subordination sequence from a highest level to a lowest level among the plurality of levels to find an encrypted index matching the encrypted index query, searches an encrypted data group classified by an encrypted index at the lowest level specified by this search to find encrypted data matching the encrypted data query, and returns the encrypted data that is found to the search client.

5. The searchable encryption processing system according to claim 4, further comprising a registration client, wherein a processor of the registration client:
encrypts plaintext data to generate encrypted data, anonymizing a plaintext index for classifying the plaintext data to generate an encrypted index, and transmitting the encrypted data and the encrypted index to the server.

6. The searchable encryption processing system according to claim 5, wherein search client computer applies a predetermined algorithm to the plaintext data to generate the plaintext index.

7. The searchable encryption processing system according to claim 6, wherein the search client computer applies a hash function or n-gram to the plaintext data to generate the plaintext index.

8. The searchable encryption processing system according to claim 7, wherein search client computer encrypts an identifier indicating the plaintext data to generate the encrypted identifier, and transmits the encrypted identifier to the server.

9. The searchable encryption processing system according to claim 8, wherein the search client computer generates the same number of the encrypted identifiers for each of the encrypted indices.

10. The searchable encryption processing system according to claim 9, wherein the search client computer further:
forms the encrypted indices in the plurality of levels depending on the subordination in the classification concepts of the plaintext data, and
transmits the encrypted indices in the plurality of levels and the encrypted data to the server.

11. The searchable encryption processing system according to claim 1, wherein the bitwise operator is an Exclusive Or (XOR) operator.

12. A searchable encryption processing method that improves data security, the method comprising:
storing, by a server, an encrypted identifier in association with an encrypted index in a memory, wherein the encrypted identifier is obtained by encrypting an identifier indicating plaintext data classified by the encrypted index, and
storing, by the server, a relational table in the memory, wherein the relational table indicates a correspondence relation between the encryption identifier and an address of encrypted data originated from the plaintext data
encrypting, by a search client computer, a plaintext query to form an encrypted data query;
encrypting, by the search client computer, a plaintext index to form an encrypted index query;
transmitting, by the search client computer , the encrypted data query and the encrypted index query to the server;
searching, by the server, the memory for a matching encrypted index that matches the encrypted index query using a bitwise operator;
searching, by the server, for matched encrypted data from an encrypted data group classified by the matching encrypted index for encrypted data matching the encrypted data query using the bitwise operator;
transmitting, by the server, the matched encrypted data to the search client computer;
acquiring, by the search client computer, the encrypted identifier associated with the matching encrypted index searched from the server,
decrypts the encrypted identifier associated with the matching encrypted index searched by applying a predetermined key to acquire an identifier of plaintext data,
checking, by the search client computer, the identifier of the plaintext data against the relational table,
identifying, by the search client computer, the address of encrypted data corresponding to the identifier of the plaintext data to acquire the encrypted data, and
forming, by the search client computer, returned plaintext data by decrypting the matched encrypted data received from the server.

13. The searchable encryption processing method according to claim 12, wherein the bitwise operator is an Exclusive Or (XOR) operator.

* * * * *